US009238410B2

(12) United States Patent
Nakagawa

(10) Patent No.: US 9,238,410 B2
(45) Date of Patent: Jan. 19, 2016

(54) VEHICLE INFORMATION MANAGEMENT SYSTEM, VEHICLE-MOUNTED INFORMATION TERMINAL AND VEHICLE INFORMATION PROVIDING DEVICE

(75) Inventor: Masashi Nakagawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 258 days.

(21) Appl. No.: 13/979,004

(22) PCT Filed: Jan. 5, 2012

(86) PCT No.: PCT/JP2012/050082
§ 371 (c)(1),
(2), (4) Date: Jul. 10, 2013

(87) PCT Pub. No.: WO2012/096209
PCT Pub. Date: Jul. 19, 2012

(65) Prior Publication Data
US 2013/0289821 A1 Oct. 31, 2013

(30) Foreign Application Priority Data
Jan. 12, 2011 (JP) .................................. 2011-004062

(51) Int. Cl.
*G01M 17/00* (2006.01)
*B60L 3/12* (2006.01)
(Continued)

(52) U.S. Cl.
CPC ................. *B60L 3/12* (2013.01); *B60L 3/0046* (2013.01); *B60L 11/185* (2013.01); *B60L 11/1816* (2013.01); *B60L 11/1846* (2013.01); *B60L 11/1861* (2013.01); *B60L 2240/545* (2013.01); *B60L 2240/547* (2013.01);
(Continued)

(58) Field of Classification Search
None
See application file for complete search history.

(56) References Cited

U.S. PATENT DOCUMENTS

2008/0316009 A1 12/2008 Nagata
2009/0040068 A1* 2/2009 Oyobe et al. ............... 340/932.2
(Continued)

FOREIGN PATENT DOCUMENTS

| JP | 9 233720 | 9/1997 |
|---|---|---|
| JP | 2000 52932 | 2/2000 |
| JP | 2000-102102 A | 4/2000 |
| JP | 2004-334862 A | 11/2004 |

(Continued)

OTHER PUBLICATIONS

International Search Report Issued Apr. 10, 2012 in PCT/JP12/050082 Filed Jan. 5, 2012.

*Primary Examiner* — Thomas Tarcza
*Assistant Examiner* — Garrett Evans
(74) *Attorney, Agent, or Firm* — Oblon, McClelland, Maier & Neustadt, L.L.P.

(57) ABSTRACT

Provided is a vehicle information management system having a vehicle-mounted information terminal and a management center. The vehicle-mounted information terminal collects vehicle information including charge information indicating a charging status of a storage battery. The storage battery is mounted on a vehicle configured from an electric vehicle or a hybrid vehicle. The management center manages the vehicle information uploaded from the vehicle-mounted information terminal. The vehicle-mounted information terminal is configured so as to monitor a vehicle state. The vehicle-mounted information terminal uploads the vehicle information to the management center when the vehicle state is shifted to an upload state as a previously defined state on the basis of a monitoring result which is a result of the monitoring.

15 Claims, 11 Drawing Sheets

(51) Int. Cl.
*B60L 11/18* (2006.01)
*B60L 3/00* (2006.01)

(52) U.S. Cl.
CPC ....... *B60L 2240/549* (2013.01); *B60L 2240/70* (2013.01); *B60L 2240/80* (2013.01); *B60L 2250/10* (2013.01); *B60L 2250/16* (2013.01); *B60L 2260/58* (2013.01); *Y02T 10/705* (2013.01); *Y02T 10/7005* (2013.01); *Y02T 10/7044* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/169* (2013.01); *Y04S 30/14* (2013.01)

(56) References Cited

U.S. PATENT DOCUMENTS

2011/0218703 A1    9/2011  Uchida
2012/0041855 A1*   2/2012  Sterling et al. ................. 705/34

FOREIGN PATENT DOCUMENTS

| JP | 2006 74868       | 3/2006 |
| JP | 2006-193138 A    | 7/2006 |
| JP | 2007-213324      | 8/2007 |
| JP | 2007 228657      | 9/2007 |
| WO | WO 2010/052533 A1 | 5/2010 |
| WO | WO 2010/052533 A8 | 5/2010 |

* cited by examiner

Fig.2

| Uploading Condition | Vehicle Information to be Uploaded |
|---|---|
| At Starting of Normal Charging | •Currently Remaining Battery<br>•Current Time<br>•Charging End Expected Time<br>•AC Power Supply State<br>•Cause of Start of Charging (Timer Charging or Not) |
| At Starting of Timer Charging | •Currently Remaining Battery<br>•Current Time<br>•Charging End Expected Time<br>•AC Power Supply State<br>•Cause of Start of Charging (Timer Charging or Not) |
| At End of Charging (Normal) | •Currently Remaining Battery<br>•Current Time |
| At Change in Charging State<br>•At n% Increase in Charging Rate<br>•After n Minutes from Starting Charging<br>•<br>• | •Currently Remaining Battery<br>•Current Time<br>•Charging End Expected Time |
| Charging cannot be Started<br>(Power Supply Plug Forgotten to be Inserted, Loose Connection) | •Currently Remaining Battery<br>•Current Time<br>•Power Supply Plug Insertion State<br>•AC Power Supply State |
| At End of Charging (Abnormality) | •Currently Remaining Battery<br>•Current Time<br>•Cause of End of Charging<br>(Power Supply Plug Being Unplugged, Insufficient Voltage, Battery Failure, ...) |
| At ACC-OFF<br>( •Vehicle Bus: Inactive )<br>( •At IG-OFF ) | •Currently Remaining Battery<br>•Current Time<br>•Power Supply Plug Insertion State<br>•Timer Programmed Charging State<br>•Current Location (Location Information)<br>•Drivable Distance by Battery<br>•Total Travel distance<br>•Travel distance in Trip (Travel distance in IG-ON)<br>•Travel distance by Electric Power<br>•Electric Power Consumption in Trip<br>•Fuel Consumption in Trip<br>•Total Drivable Distance<br>•Drivable Distance by Electric Power<br>•Pre-Air Conditioning Operating State<br>•Compartment Temperature<br>•Wind Direction |
| At ACC-OFF<br>and<br>n Days since Latest Uploading of Vehicle | •Battery Temperature History<br>•Number of Times of Remaining Battery Reached Lower Limit<br>•Travel distance<br>•Voltage at Full Charge |
| At Detection of Failure | •Warning Turned-on State<br>•DTC (Diagnostic Trouble Code) |
| At Request from Center | •Requested Item |

Fig. 3

| ID | Situation notified to User | Registered Contents of Notification Content Database ||| Uploading Timing from Vehicle | Information Acquired from Vehicle |
|---|---|---|---|---|---|---|
| | | Notification Content | Message Example | Guide Information Notifying Timing | | |
| 1-1 | State of Charging Progress / Start Charging | •Currently Remaining Battery<br>•Current Time<br>(Charging Start Time)<br>•Charging End Expected Time | Charging Started<br>Charging Condition:(Rapid/Normal)<br>(100V/200V)<br>Charging Start Time:<br>n o'clock and n minutes<br>Charging End Expected Time:<br>n o'clock and n minutes | When Event is Detected at Management Center and Guide Information Request is Made | At Occurrence of Event | •Currently Remaining Battery<br>•Current Time<br>•Charging End Expected Time<br>•AC Supply State<br>•Cause of Start of Charging (Timer Charging or Not) |
| 1-2 | Start Charging (Timer) | •Currently Remaining Battery<br>•Current Time<br>(Charging Start Time)<br>•Charging End Expected Time | Timer Charging Started<br>Charging Condition:(Rapid/Normal)<br>(100V/200V)<br>Charging Start Time:<br>n o'clock and n minutes<br>Charging End Expected Time:<br>n o'clock and n minutes | | | |
| 1-3 | End of Charging (Normal Ending) | •Current Time<br>(Charging Completion Time)<br>•Currently Remaining Battery | Charging Completed<br>Charging Completion Time:<br>n o'clock and n minutes<br>Battery Charging Rate: n% | | | •Currently Remaining Battery<br>•Current Time |
| 1-4 | State of Charging Progress | •Current Time<br>•Charging End Expected Time<br>•Currently Remaining Battery | Charging<br>Battery Charging Rate: n%<br>Charging End Expected Time:<br>n o'clock and n minutes | When Event is Detected at Management Center and Guide Information Request is Made | When Event occurs and Uploading Condition is Satisfied<br>(n% Increase in Charging Rate, n Minutes Since Start of Charging) | •Currently Remaining Battery<br>•Current Time<br>•Charging End Expected Time<br>•AC Supply State |

Fig.4

| ID | Situation notified to User | | Notification Content Database | | | Uploading Timing from Vehicle | Information Acquired from Vehicle |
|---|---|---|---|---|---|---|---|
| | | | Notification Content | Message Example | Guide Information Notifying Timing | | |
| 2-1 | Charging Non-performable State | Charging cannot be Started | ·Currently Remaining Battery ·Current Time (Charging Start Time) | Timer Charging Cannot Be Started. Please Check Power Source. : n o'clock and n minutes :Battery Charging Rate: n % | When Event is Detected at Center, and Timer Setting is On | At Occurrence of Event | ·Currently Remaining Battery ·Current Time ·Power Supply Plug Insertion State ·AC Supply State |
| 2-2 | | End of Charging (Abnormal) | ·Current Time (Charging Completion Time) ·Currently Remaining Battery ·Cause of Ending | Charging Has Been Stopped. :Details of Abnormality : n o'clock and n minutes :Battery Charging Rate: n % | When Event is Detected at Center | At Occurrence of Event | ·Currently Remaining Battery ·Current Time ·Cause of End of Charging (Power Supply Plug Being Unplugged, Insufficient Voltage, Broken Battery,...) |
| 3-1 | State Recommended to User | Charging Recommended in View of Driving Pattern | ·Recommended Operation (Set Time Charging) | Setting of Timer recommended Usual Charging Time: n o'clock and n minutes | When Request for Guide Information is Made, and Event is Detected at Center (In a case of driving within n minutes after end of the timer charging being n % and not having set the timer charging within n minutes after parking) | When ACC is OFF | ·Currently Remaining Battery ·Current Time ·Power Supply Plug Insertion State ·Timer-Programmed Charging State |
| 3-2 | | Charging Recommended in View of Route Guidance | ·Recommended Operation | Charging Is Recommended Due to Insufficient Battery Level for Currently Set Destination. | When Request for Guide Information is Made, and Event is Detected at Center (Destination is set in navigation, and battery level is insufficient for distance to the destination and the drivable distance being n Km) | When ACC is OFF | ·Currently Remaining Battery ·Current Location (Location Information) ·Possible Travel distance by Battery |

Fig. 5

| ID | Situation notified to User | | Notification Content Database | | Guide Information Notifying Timing | Uploading Timing from Vehicle | Information Acquired from Vehicle |
|---|---|---|---|---|---|---|---|
| | | | Notification Content | Message Example | | | |
| 4-1 | Vehicle Operating State | Travel distance | • Total Travel distance<br>• Today's Travel distance<br>• Distance Covered by Electric Power<br>• Drivable Distance | n Km were driven today.<br>n Km was covered by motor.<br>n more Km can be driven hereon.<br>Total travel distance until now is n Km. | When Detection occurs at Center, and Request for Guide Information is Made | When ACC is OFF | • Total Travel distance<br>• Travel distance in Trip (Travel distance in IG-ON)<br>• Travel distance By Electric Power<br>• Drivable Distance |
| 4-2 | | Timer setting | • Plug Insertion State<br>• Timer Charging Setting | Time Charging Is Set As:<br>Charging Start:<br>n o'clock and n minutes<br>End of Charging:<br>n o'clock and n minutes<br>Charging Plug Is Plugged/Unplugged | When Detection occurs at Center (Update WEB, Cell Phone Application Only) | When ACC is OFF | • Timer-Programmed Charging State<br>• Power Supply Plug Insertion State |
| 4-3 | | Electric Power Amount | • Electric Power Consumption<br>• Fuel Consumption<br>• Electric Drivable Distance | In today's drive, gasoline: n liters was saved, corresponds to n fluorescent light; n minutes. n more Km can be driven hereon by battery. | When Detection occurs at Center (Update WEB, Cell Phone Application Only) | When ACC is OFF | • Travel distance in Trip (Travel distance in IG-ON)<br>• Travel distance Record by Electric Power<br>• Electric Power Consumption in Trip<br>• Electric Power Consumption in IG-ON<br>• Reduced Fuel Consumption in Trip<br>• Reduced Fuel Consumption in IG-ON<br>• Total Drivable Distance |
| 4-4 | | Pre-Air Conditioning | • Pre-air Conditioning Operating State<br>• Compartment Temperature | Pre-Air Conditioning<br>n o'clock and n minutes<br>Mode: n mode<br>Temperature: n degrees Celsius | When Detection occurs at Center, and Request for Guide Information is Made | At Occurrence of Event, and Every n minutes from Occurrence of Event | • Pre-air Conditioning Operating State<br>• Compartment Temperature<br>• Wind Direction<br>• Current Time |

Fig.6

Notification Content Database

| ID | Situation notified to User | | Notification Content | Message Example | Guide Information Notifying Timing | Uploading Timing from Vehicle | Information Acquired from Vehicle |
|---|---|---|---|---|---|---|---|
| 5-1 | Prediction of Disadvantage for User | When Failure Is Detected | • Content of Failure | Warning Is Detected. <Detailed Content of Failure Ex: HV Battery Reached High Temperature. Please Park at Safe Site. And Contact Dealership.> | When Event is Detected at Control Center, and Seriousness of Failure Is High | At Occurrence of Event | • Warning Lighting State • DTC (Diagnostic Trouble Code) |
| 5-2 | | When Failure Is Predicted | • Advice | Ex: Battery Cannot Exhibit Original Performance Due to Deterioration over time. Replacement at Dealership Is Recommended | When Event is Detected at Control Center, and Seriousness of Failure Is High | When ACC is OFF, and n Days Elapsed Since Previous Transmission to Center | • History of Battery Temperature • Number of Times Reaching Lower Limit of Remaining Battery • Travel distance • Voltage at Full Charge |
| 6-1 | Driving State | | • Current Time • Total Travel distance | Travel distance Exceeded Distance with High Possibility of Failure. Please Conduct Car Maintenance. | When Travel distance Exceeded n Km | When Upload Condition is met | • Travel distance • Current Time |
| 6-2 | Charging State | Charging Start 2 | • Currently Remaining Battery • Current Time | Charging Rate Is Being Decreased | When Outside Temperature is n degrees Celsius or Lower When driving in low-temperature region | When Upload Condition is met | • Temperature • Currently Remaining Battery |

Fig.7

| User Name | Terminal Information | | |
|---|---|---|---|
| | Terminal ID | Terminal Type | Notifying means of Guide Information |
| User A | IDa1 | Cell Phone | Email Address |
| | IDa2 | Personal Computer | Email Address |
| | IDa3 | Personal Computer | Guide Information Providing Website (web) |
| User B | IDb1 | Cell Phone | Phone Number |
| | IDb2 | Cell Phone | Email Address |
| | IDb3 | Cell Phone | Application |
| | IDb4 | Personal Computer | Guide Information Providing Website (web) |
| User C | IDc1 | Vehicle-Mounted Information Terminal | Application |
| . | . | . | . |
| . | . | . | . |
| User n | IDn | . | . |

Fig.8

| Delivery History of Guide Information | Delivery Recipient | Delivery State | Viewed State by User | Handling |
|---|---|---|---|---|
| State ID1-1 (Charging Start Guidance) | Terminal IDa1 (cell phone: email) | Delivered | Email Viewed | |
| | Terminal IDa2 (PC: email) | Delivered | Email Unopened | →Handled as Read |
| | Terminal IDa3 (PC: Guide Information Providing Website) | Updated | Not Confirmed | →Handled as Read |
| State ID1-3 (Charging Progress Guidance) | Terminal IDa1 (cell phone: email) | Delivered | Email Viewed | |
| | Terminal IDa2 (PC: email) | Not Delivered | Not Confirmed | No Email Delivery |
| | Terminal IDa3 (PC: Guide Information Providing Website) | Updated | Not Confirmed | →Handled as Read |
| ⋮ | ⋮ | ⋮ | ⋮ | ⋮ |

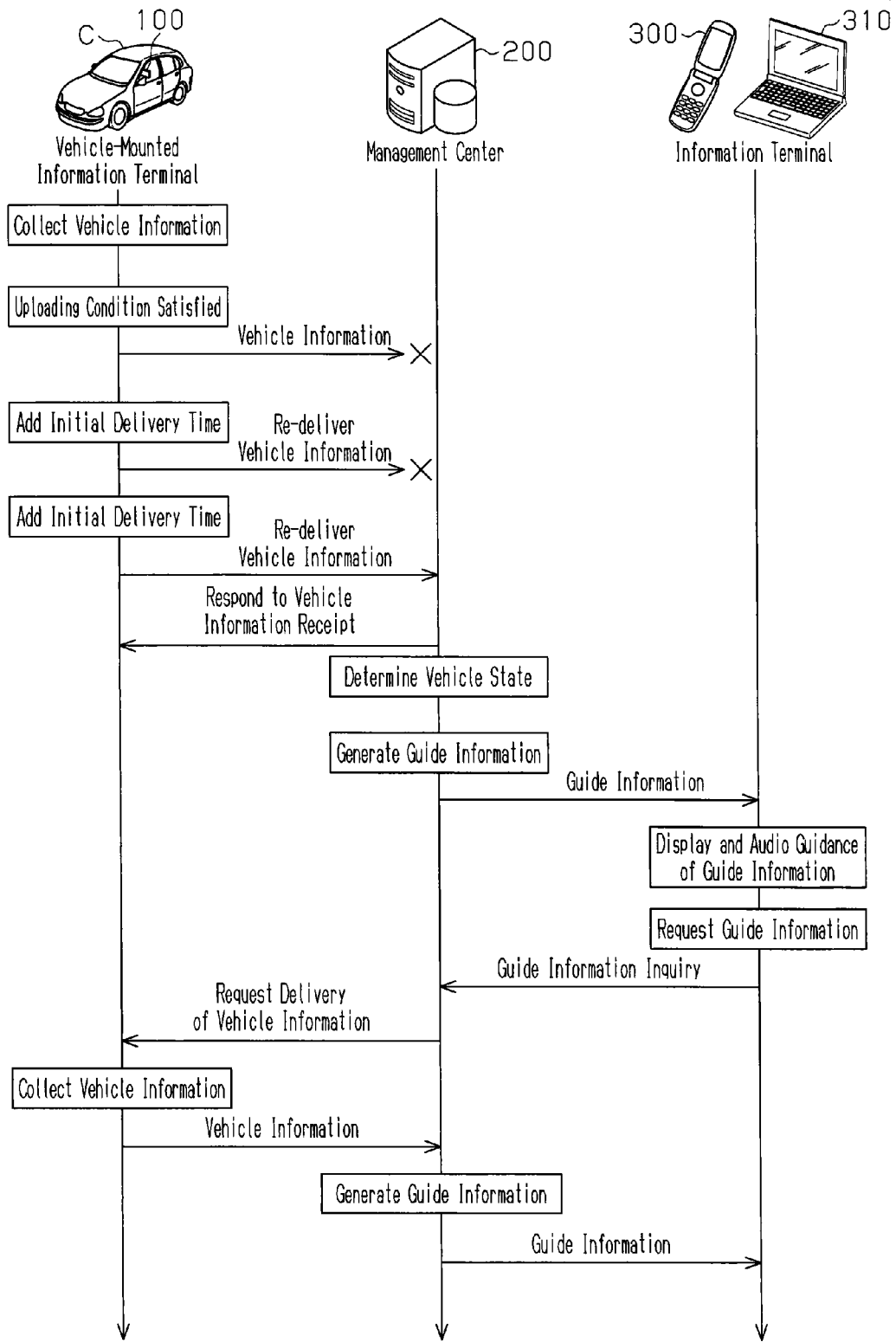

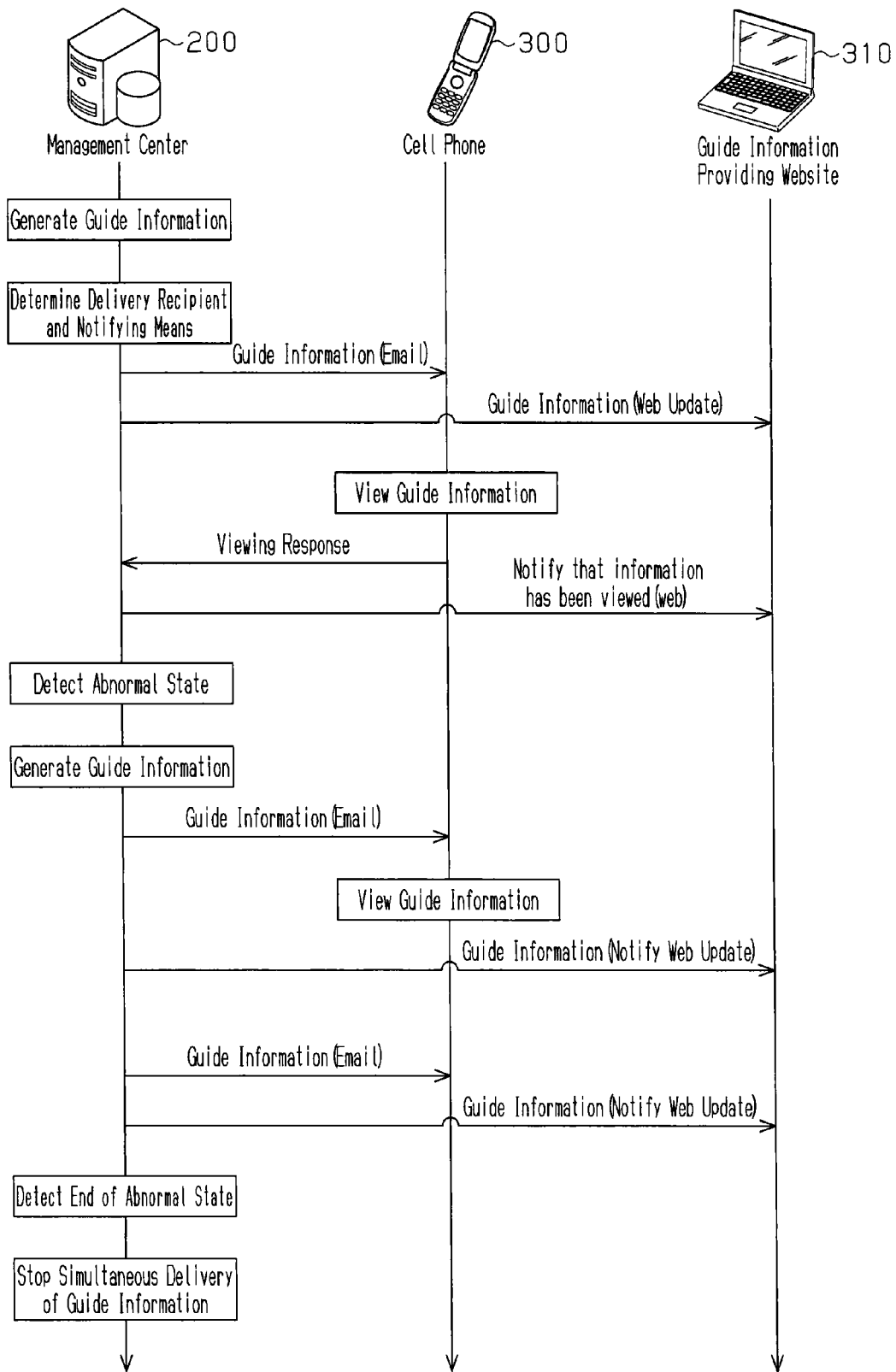

VEHICLE INFORMATION MANAGEMENT SYSTEM, VEHICLE-MOUNTED INFORMATION TERMINAL AND VEHICLE INFORMATION PROVIDING DEVICE

FIELD OF THE DISCLOSURE

The present disclosure relates to a vehicle information management system that handles vehicle information including a state of charge of a secondary battery mounted on a vehicle.

Further, the present disclosure relates to a vehicle-mounted information terminal and a vehicle information providing device used in the vehicle information management system.

BACKGROUND OF THE DISCLOSURE

In recent years, a system known as a system that learns a state of a vehicle includes a vehicle-mounted information terminal mounted on the vehicle to collect vehicle information indicating the vehicle state, and a specific center (data center) that controls the vehicle information. The vehicle-mounted information terminal sends the collected vehicle information to the specific center through a wireless communication function.

For example, a system seen in Patent Document 1 detects the presence and absence of an abnormality in a passenger compartment by an abnormality detection sensor. As a result thereof, for example, when an occurrence of an abnormality of an improper unlocking in a door lock is detected, the detection result is delivered to a specific center as vehicle information of the vehicle. In this system, in a case where the occurrence of the abnormality is notified as above to the center, the center transfers information informing the occurrence of the abnormality in the vehicle to a cell phone and the like of the owner of the vehicle as a delivery source of the vehicle information, that is, the user (driver). Accordingly, the owner of the vehicle can learn that the abnormality has occurred in the vehicle based on the information delivered from the center.

On the other hand, recently, accompanying the spread of electric vehicles and hybrid vehicles, a development of a system that enables learning a state of a secondary battery mounted on a vehicle as above is in progress. For example, a system described in Patent Document 2 sends information indicating the state of charge of the secondary battery mounted on the electric vehicle located at a charging station to a specific center. The center having received the information sets a charging schedule of the secondary battery based on the information. Further, the center generates information notifying charged amount and remaining amount of the secondary battery based on the information received from the vehicle, and sends the generated information to an information terminal such as a cell phone possessed by an owner of the relevant vehicle. As above, according to the system described in Patent Document 2, automation of the charging is achieved through the charging schedule set based on the state of the secondary battery acquired from the vehicle. The user can remotely learn the state of the secondary battery mounted on the vehicle.

PRIOR ART DOCUMENTS

Patent Documents

Patent Document 1: Japanese Laid-Open Patent Publication No. 2000-52932

Patent Document 2: Japanese Laid-Open Patent Publication No. 2006-74868

SUMMARY OF THE INVENTION

Problems that the Invention is to Solve

The vehicle information indicating the vehicle state includes various types of information such as operating states of respective control apparatuses mounted on the vehicle, the state of the secondary battery, fuel efficiency, and the like. Although the system of Patent Document 1 can learn the presence and absence of the occurrence of abnormality in the vehicle, it cannot learn other states. Further, since such vehicle information changes occasionally. If all of the vehicle information going under change is to be delivered to the center, there is a risk that a communication traffic between the vehicle and the center becomes excessive. Further, the system described in Patent Document 2 can acquire the information indicating the state of charge of the vehicle.

However, an increase in a communication traffic cannot be ignored if the information is delivered to the center each time the state of charge of the vehicle changes. In addition, since the system described in Patent Document 2 delivers the vehicle information to the center on condition that the vehicle is located at the charging station, a communicating condition is dependent on an external environment of the vehicle.

An objective of the present disclosure is to provide a vehicle information management system that is capable of uploading vehicle information including the state of a secondary battery to a center at required timing and in a required information volume, and controlling the same. Further, the present disclosure provides a vehicle-mounted information terminal and a vehicle information providing device.

Means for Solving the Problems

In accordance with one aspect of the present disclosure, a vehicle information management system is provided that includes a vehicle-mounted information terminal and a management center. The vehicle-mounted information terminal is configured to collect vehicle information including charge information indicating a charging state of a secondary battery. The secondary battery is mounted on a vehicle configured of an electric vehicle or a hybrid vehicle. The management center is configured to control the vehicle information uploaded from the vehicle-mounted information terminal. The vehicle-mounted information terminal is configured to monitor a vehicle state that is a state of the vehicle. The vehicle-mounted information terminal is further configured to upload the vehicle information to the management center in response to shifting of the vehicle state to an upload state as a predefined state based on a monitoring result that is a result of the monitoring.

According to the configuration, even if the vehicle information including the charge information indicating the charging state of the secondary battery is collected, the vehicle-mounted information terminal does not upload the vehicle information until the vehicle state shifts to the predefined state. On the other hand, the vehicle-mounted information terminal uploads the collected vehicle information to the management center on condition that the vehicle state has shifted to the predefined state. Accordingly, for example, even if the charging rate of the secondary battery increases by 1% accompanying the charge of the secondary battery mounted on the vehicle, the vehicle information including the charge information indicating the change by 1% is not uploaded from the vehicle-mounted information terminal to the management center each time the charging rate is increased. Due to this, the vehicle-mounted information terminal is capable of uploading the vehicle information collected to indicate the vehicle state at that time to the management center at timing when the vehicle state has shifted to the predefined state. That is, the vehicle-mounted information terminal is capable of uploading the latest vehicle information on the information renewed and collected to the management center, and uploading the vehicle information accumulated for information accumulated and collected to the management center. Thus, the vehicle-mounted information terminal is enabled to upload the vehicle information to the management center at the right time when the vehicle information is required with just a required information volume, and the management center can control such vehicle information.

Further, according to the above configuration, the necessity of the uploading of the vehicle information is determined with criteria of whether the vehicle state has shifted to the upload state as the predefined state. Due to this, the uploading condition of the vehicle information is not dependent on an external environment of the vehicle. Thus, the vehicle-mounted information terminal can solely upload the vehicle information under a higher degree of freedom. That is, the vehicle-mounted information terminal is capable of uploading the vehicle information with even more accurate timing.

According to one form of the disclosure, shifting of the vehicle state to the upload state refers to the occurrence of a significant change in the vehicle state. The vehicle-mounted information terminal is configured to upload the vehicle information indicating the significant change to the management center.

For example, even if the charging rate of the secondary battery changes from 1% to 2%, an influence of the change in the charging rate on a possible travel distance of the vehicle correlated to the changed charging rate is low. That is, even if the vehicle-mounted information terminal uploads such a trivial change each time, the utility thereof is low. On the other hand, for example, when the charging rate of the secondary battery changes from 10% to 50%, the influence on the possible travel distance of the vehicle correlated to the charging rate is large, and the utility of the vehicle information indicating such a change is high. Thus, according to the configuration, when the change in the vehicle state with the high utility, in other words, the significant change occurs in the vehicle, the vehicle-mounted information terminal uploads the vehicle information indicating the change to the management center. Accordingly, the management center is capable of collecting only the vehicle information with the high utility when learning the vehicle state based on the vehicle information.

According to one form of the disclosure, the significant change in the vehicle state is at least one of:

a change in the vehicle from an ignition-ON state to an ignition-OFF state;

a change in an accessory position of the vehicle from an ON state to an OFF state;

a change in a vehicle bus, which connects the vehicle-mounted information terminal and a control system of the vehicle to each other within the vehicle by a bus from an activated state to an inactivated state;

a change from an ignition-OFF state to an ignition-ON state;

a change in the accessory position from an OFF state to an ON state; and a change in the vehicle bus from the inactivated state to the activated state.

When the ignition has changed from the ON state to the OFF state, or when the accessory position has changed from the ON state to the OFF state, it is possible to assume that the vehicle state has shifted from a driving state to a parked state. Thus, as in the above configuration, if the vehicle-mounted information terminal performs the uploading of the vehicle information based on the changes in the on/off states of the ignition and the accessory position, the vehicle information indicating the vehicle state when the vehicle has changed from the driving state to the parked state, and the vehicle information accumulated and renewed during the drive of the vehicle can collectively be uploaded. On the other hand, when the ignition has changed from the OFF state, to the ON state, or when the accessory position has changed from the OFF state, to the ON state, it is possible to assume that the vehicle state has shifted from the parked state to the driving state. Thus, in this case, the vehicle-mounted information terminal can collectively upload the vehicle information indicating the vehicle state when the vehicle has changed from the parked state to the driving state, and the vehicle information accumulated and renewed during the parking of the vehicle.

Further, when the vehicle bus, which is the transmission path of the vehicle information, changes from the activated state to the inactivated state, it is possible to assume that the vehicle state, which changes due to various causes, has become stabilized. According to the configuration, the vehicle-mounted information terminal is capable of uploading the vehicle information with criteria on that the vehicle state has changed from a dynamic state to a static state such as at the charge completion of the secondary battery, ending of the drive of the vehicle and the like, by performing the uploading of the vehicle information based on the activation state of the vehicle bus. Thus, the vehicle information indicating the vehicle state at shifting to the stabilized state and the vehicle information accumulated when the vehicle is in the dynamic state is capable of being collectively uploaded. On the other hand, when the vehicle bus that is the transmission path of the vehicle information changes from the inactivated state to the activated state, it is possible to assume that the stabilized state of the vehicle has ended. Thus, in this case, the vehicle information is capable of being uploaded with criteria on that the vehicle state has changed from the static state to the dynamic state such as upon the charge start of the secondary battery, start of the drive of the vehicle and the like. Thus, the vehicle information indicating the vehicle state upon shifting to the dynamic state and the vehicle information accumulated when the vehicle is in the static state is capable of being collectively uploaded.

According to one form of the disclosure, the vehicle information includes information indicating at least one of:

a remaining charging time required for charging to be completed when the secondary battery is in a state of charging;

a connection state between a power supply plug that supplies power to the secondary battery and the secondary battery;

a deteriorated state of the secondary battery;

a possible vehicle travel distance correlated to the charging state of the secondary battery; and a charging rate of the secondary battery.

According to the above configuration, in charging the secondary battery mounted on the vehicle, the vehicle-mounted information terminal is capable of acquiring the inappropriate state of the secondary battery such as the loose connection of the power supply plug, the deteriorated state of the secondary battery and the like, and acquiring information related to travel distance and the like to which the charging state is reflected. Thus, the management center to which the vehicle information including such information is uploaded is capable of learning the state of charge such as the remaining charge time of the secondary battery mounted on the vehicle, the connection state of the power supply plug, the deteriorated state, the possible travel distance, the charging rate (remaining charge) and the like.

According to one form of the disclosure, the vehicle-mounted information terminal has a function to add information indicating a delivery time to the vehicle information. The vehicle-mounted information terminal is configured to upload the vehicle information to which the delivery time is added to the management center. The vehicle-mounted information terminal is configured, when an upload error occurs in the vehicle information to the management center, to re-upload the vehicle information that the upload error has occurred to the management center, and sets the delivery time added to the vehicle information upon an initial delivery as the delivery time to be added to the vehicle information to be re-uploaded.

According to the above configuration, the delivery time is added to the vehicle information when the vehicle information is uploaded from the vehicle-mounted information terminal to the management center. When an upload error occurs in uploading such vehicle information, the vehicle-mounted information terminal adds the delivery time of the initial delivery to the vehicle information instead of the delivery time. Thus, even if a delay occurs between the time when the management center received the vehicle information and the time of the vehicle state indicated by the vehicle information due to the upload error of the vehicle information in the vehicle-mounted information terminal, the management center is capable of recognizing that the initial delivery time added to the vehicle information is the time of the vehicle state indicated by the vehicle information. Due to this, even if an upload error occurs in the vehicle information, the management center is capable of accurately learning the time of the vehicle state indicated by the content of the vehicle information.

According to one form of the disclosure, the vehicle information includes a plurality of items indicating the vehicle state. A plurality of types of conditions are defined as conditions under which the vehicle information is to be uploaded. One or more items indicating the vehicle state are associated with each of the defined conditions. The vehicle-mounted information terminal is configured, in response to shifting of the vehicle state to a corresponding condition, to upload information related to the one or more of items associated to the condition to the management center.

According to the above configuration, when the vehicle state has shifted to the respective states defined as the types of conditions, only the vehicle information that is necessary and sufficient for indicating the vehicle state satisfying the defined conditions is uploaded from the vehicle-mounted information terminal to the management center. Accordingly, the management center is capable of accurately learning the shifted vehicle state. The vehicle-mounted information terminal is capable of uploading the vehicle information with the minimum necessary information volume when transmitting the vehicle state to the management center.

According to one form of the disclosure, the management center is configured to generate guide information for guiding a user of the vehicle with respect to the vehicle state based on the vehicle information uploaded from the vehicle-mounted information terminal. The management center is further configured to deliver the generated guide information to a user information terminal as an information terminal possessed by an owner of the vehicle.

According to the above configuration, the guide information generated based on the vehicle information is delivered to the user information terminal possessed by the owner of the vehicle. Thus, the owner of the vehicle is capable of remotely learning his vehicle state based on the guide information provided through such a user information terminal. Further, such guide information is uploaded to the management center on condition that the vehicle state has shifted to the defined condition. Thus, as a combined effect thereof, the user information terminal is capable of providing the user of useful guide information in which the vehicle state shifting is reflected.

According to one form of the disclosure, the management center is configured to deliver relevant guide information to a plurality of user information terminals each of which has previously been registered for each of owners of the vehicles.

The user information terminal that the owner of the vehicle possesses includes in many cases a plurality of types of information terminals such as a cell phone and a personal computer, for example. Providing manners of information via such types of user information terminals have a variety. That is, according to the above configuration, for example, it is possible to deliver the guide information to the owner of the vehicle through not only an email to a cell phone or an application used in the cell phone, but also a members-only website or World Wide Web and the like that can be used via a terminal such as a personal computer and the like. Thus, expansion of the transmitting means of the guide information is obtained, and the transmission of the guide information for notifying the state of the vehicle to the owner thereof is more ensured.

According to one form of the disclosure, the management center is configured, upon delivery of the guide information to the user information terminals, to detect presence or absence of viewing of the guide information by the owners of the user information terminals for each of the user information terminals. The management center is further configured, when the presence of the viewing of the guide information by a certain user information terminal is detected based on a view detection result that is a result of the detecting, to perform one of the following processes to other user information terminals registered together with the certain user information terminal:

Process a: not delivering the relevant guide information, and

Process b: delivering that the relevant guide information has been viewed.

According to the above configuration, the management center does not deliver the guide information once it has been viewed in a certain user information terminal other user information terminals, or deliver a content that "the guide information has already been viewed" to the other user information terminals. Thus, in the management center delivering the guide information via the user information terminals, the guide information indicating the same content is not redundantly delivered to the owner of the vehicle, nor a complication will arise therefrom. Accordingly, a convenience of viewing the guide information delivered from the management center in the user information terminals is improved.

According to one form of the disclosure, the management center is configured to periodically perform simultaneous delivery of the guide information related to vehicle information indicating a relevant abnormal state to each of the user information terminals until when the abnormal state of the vehicle or the secondary battery is resolved.

According to the above configuration, for example, when a loose connection occurs in the power supply plug for supplying electric power to the secondary battery, or when an abnormality such as a failure of the second battery or the vehicle occurs, the guide information informing the abnormal state is periodically and simultaneously delivered to the respective user information terminals that the owner of the vehicle possesses until the abnormal state in the vehicle is resolved. Accordingly, it is possible to alert the owner of the vehicle to whom such guide information is provided of the occurrence of abnormality in one's vehicle, which enables resolving of the abnormality having occurred in the vehicle or the secondary battery to be prompted.

According to one form of the present disclosure, when information indicating at least one of the followings is included in the vehicle information:

a remaining charging time required for charging of the secondary battery in a state of charging to be completed;

a connection state between a power supply plug that supplies power to the secondary battery and the secondary battery;

a deteriorated state of the secondary battery;

a possible vehicle travel distance correlated to the charging state of the secondary battery; and a remaining charge of the secondary battery.

The management center is configured to deliver at least one of the followings as the guide information to the user information terminal:

information guiding the remaining charging time of the secondary battery;

information guiding a non-charging state of the secondary battery accompanying loose connection of the power supply plug;

information guiding the deteriorated state of the secondary battery; and information guiding insufficient charge for a planned travel distance of the vehicle.

According to the above configuration, the management center is capable of providing the user of the vehicle through the provision of the guide information with the information notifying the charge remaining time of the secondary battery, or the information such as the non-charging state of the secondary battery accompanying the loose connection of the power supply plug, the deteriorated state of the secondary battery, insufficient charge amount for the planned travel distance and the like, that is, the information notifying that the vehicle is in the inappropriate state. Accordingly, the user is capable of learning whether the charging is being performed normally or not in charging the vehicle to which the secondary battery is mounted while being far away from the vehicle. As a result, the user is capable of accurately performing the charging of the secondary battery mounted on the vehicle as a subject that provides the vehicle information, that is, the provision subject.

According to one form of the present disclosure, the management center includes a vehicle database in which the vehicle information is registered, a failure history database in which a failure history of the vehicle is registered, and a statistics database in which statistics data of the vehicle for each vehicle type is registered. The management center is configured to generate the guide information so as to include information that is registered in at least one of the vehicle database, the failure history database, and the statistics database.

Depending on the vehicle, there are a vehicle having a secondary battery of which charging efficiency decreases in a low-temperature regions, a vehicle in which failure tends to occur under a specific condition, and the like. Thus, according to the above configuration, the guide information is generated so as to include information registered in the respective databases. Thus, the management center is capable of providing the user with the guide information that notifies an influence and the like from the external environment on the vehicle and the secondary battery mounted on the vehicle. Accordingly, the management center is capable of providing more detailed guide information in view of properties of the automobile that the user possesses.

According to one form of the present disclosure, the management center includes a behavior analyzing section that analyzes behavior of a user of the vehicle based on the vehicle information. The management center is configured to generate the guide information with an analysis result of the behavior analyzing section as an index.

A behavior of a certain driver, that is, a driving pattern of the vehicle that a certain driver drives tends to have a certain pattern. For example, in a weekday driving pattern, commuting path, commuting time and the like is greatly reflected. Further, for example, a certain driver has a strong tendency to perform timer charging so as to fully charge the secondary battery within a certain period of time after having parked the vehicle. Accordingly, the behavior pattern of the driver, in many cases, is reflected to the timing of charging the secondary battery, the charge setting for the secondary battery, and the driving pattern after the completion of the charge. Thus, according to the above configuration, the behavior analyzing section predicts for example the subsequent travel distance through a behavior analysis of the user. The management center is capable of notifying the user with of charging rate, charging time, and the like that are necessary for driving the predicted travel distance if the possible travel distance correlated to the charging rate of the secondary battery is shorter than one of the predicted result. Further, if the charging of the secondary battery is not started despite the certain period of time having elapsed after parking the vehicle, it is predicted that the charging of the secondary battery is forgotten, or the loose connection of the power supply plug occurs. Thus, in such cases, the management center is capable of causing the user of the vehicle to recognize that the charging of the secondary battery is forgotten, or the loose connection of the power supply plug occurs, by providing the user with the guidance to prompt the charging of the secondary battery based on the analyzed result. Accordingly, the management center is capable of providing the guide information in view of the behavior of the driver of the vehicle, and provision of the guide information in accordance with the behavior of the driver is realized.

In accordance with another aspect of the present disclosure, a vehicle-mounted information terminal that collects vehicle information is provided. The vehicle information includes charge information indicating a charging state of a secondary battery mounted on a vehicle configured of an electric vehicle or a hybrid vehicle. The vehicle-mounted information terminal is configured to upload the collected vehicle information via a wireless communication to a management center that controls the vehicle information. The vehicle-mounted information terminal is configured to monitor a vehicle state that is a state of the vehicle, and upload the vehicle information to the management center in response to shifting of the vehicle state to an upload state as a predefined state based on a monitored result.

According to the above configuration, even if the vehicle information including the charge information indicating the state of charge of the secondary battery is collected by the vehicle-mounted information terminal, the vehicle information is not uploaded to the management center until when the vehicle state has shifted to the predefined state. The vehicle-mounted information terminal starts the uploading of the collected vehicle information to the management center on condition that the vehicle state has shifted to the defined state, that is, the upload state. Accordingly, for example, even if the charging rate increases by 1% accompanying the charging of the secondary battery mounted on the vehicle, the vehicle information including the charge information indicating such a change by 1% is not uploaded to the management center from the vehicle-mounted information terminal each time the charging rate is increased. Due to this, the vehicle information control is capable of uploading the vehicle information collected to indicate the vehicle state at that time to the management center at the timing when the vehicle state has shifted to the predefined state. That is, as for information that is renewed and collected, the latest vehicle information is uploaded. As for the information that is accumulated and collected, the vehicle information in which they are accumulated is uploaded. Accordingly, the vehicle-mounted information terminal can upload the vehicle information to the management center at the right timing when the vehicle information is required and with just the required information volume. Further, the management center can control such vehicle information.

Further, according to the above configuration, the necessity to the upload of the vehicle information is determined with the criteria of whether the vehicle state has shifted to the predefined state or not. Due to this, the uploading condition of the vehicle information is not dependent on the external environment of the vehicle. Accordingly, the vehicle-mounted information terminal is capable of uploading the vehicle information at a higher degree of freedom solely by itself, and is capable of uploading the vehicle information at a more accurate timing.

In accordance with a further aspect of the present disclosure, a vehicle information providing device in a management center is provided. The management center is configured to collect vehicle information via a wireless communication from a vehicle-mounted information terminal mounted on a vehicle and manage the vehicle information. The vehicle information includes charge information indicating a charging state of a secondary battery mounted on the vehicle configured of an electric vehicle or a hybrid vehicle. The vehicle information providing device includes a guide information generating section and a guide information delivering section. The guide information generating section generates guide information for guiding a user of the vehicle of a vehicle state that is a state of the vehicle based on the vehicle information collected from the vehicle-mounted information terminal. The guide information delivering section delivers the guide information generated by the guide information generating section to a user information terminal as an information terminal that the relevant user of the vehicle possesses.

According to the above configuration, the vehicle information providing device generates the guide information for notifying the vehicle state to the user based on the vehicle information collected by the vehicle-mounted information terminal. The guide information generated as above is delivered to the user information terminals possessed by the owner of the vehicle. Accordingly, the owner of the vehicle, while being far away from the vehicle, is capable of learning his vehicle state, the charging rate of the secondary battery mounted on the vehicle, the drivable distance based on the charging rate and the like based on the guide information provided through the user information terminals.

BRIEF DESCRIPTION OF THE DRAWINGS

FIG. 2 is a table showing an example of a correspondence relationship between an uploading condition for the vehicle-mounted information terminal of FIG. 1 to upload vehicle information to a management center, and items of the vehicle information that the vehicle-mounted information terminal is to update to the management center;

FIG. 3 is a table showing an example of a correspondence relationship between a notification content and a informing condition of guide information registered in a notification content database of the management center of FIG. 1, and a informing timing of the guide information;

FIG. 4 is a table, subsequently to FIG. 3, that shows the example of the correspondence relationship between the notification content and the informing condition of the guide information, and the informing timing of the guide information;

FIG. 5 is a table, subsequently to FIG. 4, that shows the example of the correspondence relationship between the notification content and the informing condition of the guide information, and the informing timing of the guide information;

FIG. 6 is a table, subsequently to FIG. 5, that shows the example of the correspondence relationship between the notification content and the informing condition of the guide information, and the informing timing of the guide information;

FIG. 7 is a table showing an example of a relationship between respective user information terminals owned by respective users of vehicles registered in a user information table of a management center of FIG. 1 and notifying means of guide information of respective user information terminals;

FIG. 8 is a table showing an example of a delivery history of the guide information for each user information terminal of FIG. 1, and each notifying means of guide information;

FIG. 9 is a sequence diagram showing an example of a collecting procedure of vehicle information and a delivering procedure of guide information by the vehicle information management system of FIG. 1;

FIG. 11 is a sequence diagram showing an example of the delivering procedure of the guide information by the management center of FIG. 1.

DETAILED DESCRIPTION OF THE PREFERRED EMBODIMENTS

FIG. 1 to FIG. 11 show a vehicle information management system including a vehicle-mounted information terminal and a vehicle information providing device according to an embodiment of the present disclosure.

Figure 1:
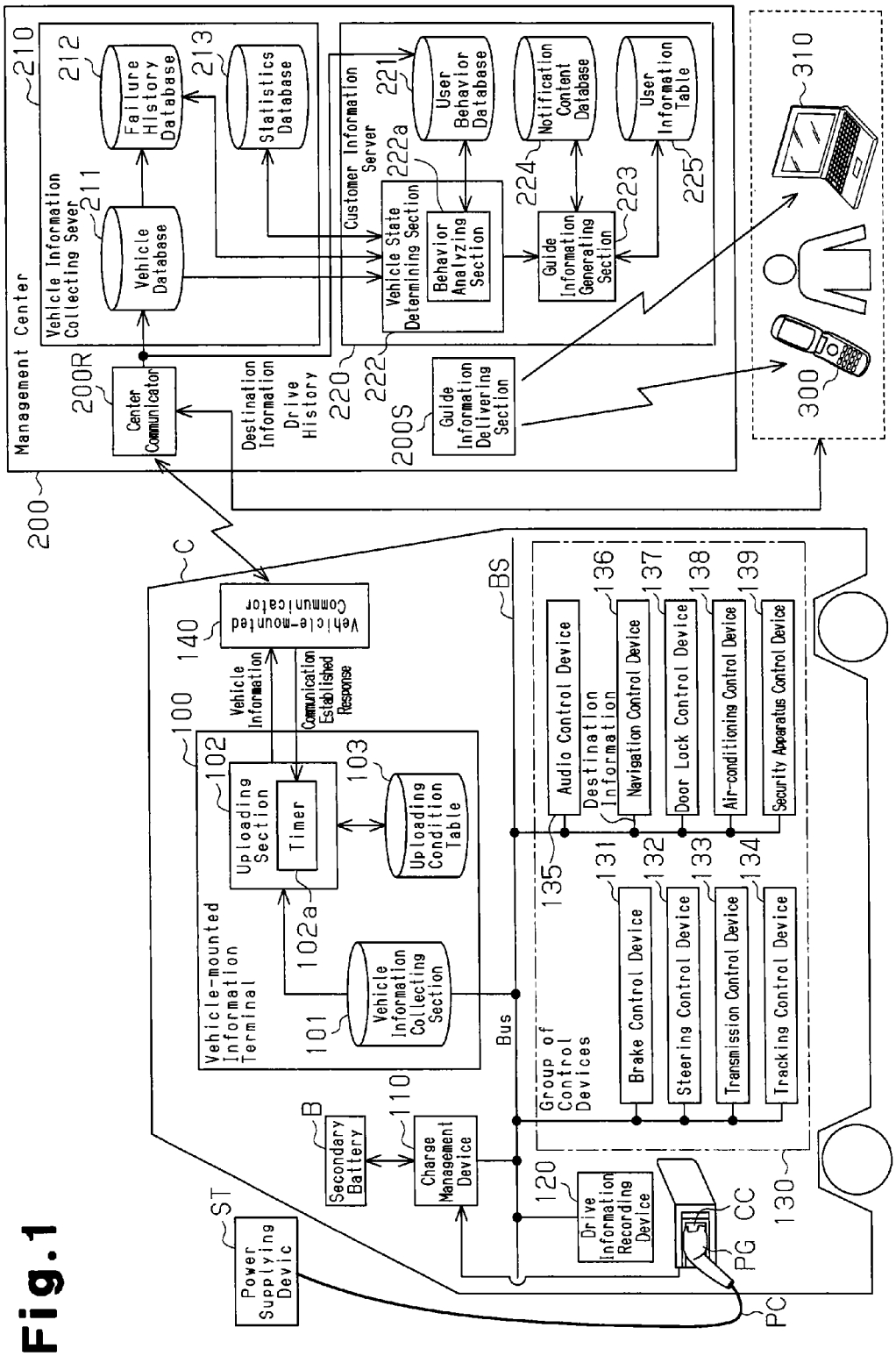
FIG. 1 is a block diagram of a vehicle information management system that includes a vehicle-mounted information terminal and a vehicle information providing device according to one embodiment of the present disclosure.

As shown in FIG. 1, the vehicle information management system of the embodiment is configured to include a vehicle-mounted information terminal 100, which collects vehicle information and is mounted on a vehicle C, and a management center 200, which controls vehicle information uploaded from the vehicle-mounted information terminal 100. Further, the vehicle C of the embodiment is configured of an electric vehicle or a plug-in hybrid vehicle, on which a secondary battery B, which is a power source of an electric motor, is mounted.

The vehicle C is for example in a stopped state, and is electrically connected to a power supplying device ST, which supplies power to the secondary battery B mounted on the vehicle C via a power supplying cable PC extended from the power supplying device ST.

The vehicle C includes a charge management device 110, which delivers the power supplied from the power supplying cable PC to the secondary battery B. In the power supplying device ST, which supplies power to the secondary battery B, a setting of a charging condition on the secondary battery B is performed by a user of the vehicle C. In this setting, various types of charging conditions are set, such as for example, a normal charge setting without the charging time and charging rate setting, a timer charge setting with the desired charging rate and charging time are defined, a normal-speed charge setting, a rapid charge setting, and the charge voltage of 100V or 200V, and the like.

On the other hand, when a power supply plug PG provided at a distal end of the power supplying cable PC is attached to a power feed inlet CC of the vehicle C, power is supplied to the charge management device 110 from the power supplying device ST. Then, the charge management device 110 performs setting as to whether the charge voltage is 100V or 200V depending on the supplied power. Further, the charge management device 110 performs setting as to whether charging is of the normal-speed charging and the rapid charging and the like. Such a charge management device 110 manages the charging rate (remaining charge) of the secondary battery B, a charge starting time, the set charging rate and a time when the secondary battery B is expected to reach a full charge (charging end expected time), an insertion state of the power supply plug PG into the power feed inlet CC, that is, an electrically connected state of the secondary battery B and the power supply plug PG, causes of ending of charging of the secondary battery B and the like. The insertion state of the power supply plug PG can be learned for example based on a detection result of a physical detection sensor or the like provided in the power feed inlet CC, the electrically connected state between the power supplying device ST and the secondary battery B and the like. Further, the charge management device 110 calculates a possible travel distance based on the charging rate of the secondary battery B, calculates a drivable distance according to a state of the secondary battery B, and calculates as necessary a consumption of power stored in the second battery B during a trip that is an interval from when an ignition key of the vehicle C is turned on to when the ignition key is turned on the next time. Further, the charge management device 110 also manages temperature changes of the secondary battery B, the number of times when the remaining power of the secondary battery B has reached a lower limit, a voltage value when the secondary battery B is fully charged, a deteriorated state of the secondary battery B, a failure state and the like. The charge management device 110 outputs as necessary charge information that is information indicating the state of the secondary battery B, which is managed by the charge management device 110 to the vehicle-mounted information terminal 100 via a vehicle bus BS, which is a communication passage such as a CAN (controller area network) each time a content of the charge information changes. Accordingly, the charge information of the secondary battery B is taken as necessary into the vehicle-mounted information terminal 100.

Further, the vehicle C includes a drive information recording device 120, which stores the drive information. The drive information recording device 120 records as necessary for example, a total travel distance of the vehicle C, the travel distance in the aforementioned trip, the travel distance when only the electric motor driven by the secondary battery B was used as the driving power source of the vehicle C, and the like. The drive information recording device 120 outputs as necessary the drive information recorded as above to the vehicle-mounted information terminal 100.

On the other hand, the vehicle C includes a group of electronic control devices 130, each electronic control device electrically controls respective vehicle-mounted apparatuses mounted on the vehicle C. The group of electronic control devices 130 include a brake control device 131, which electrically controls a brake of the vehicle C, a steering control device 132, which controls a steering of the vehicle C, a transmission control device 133, which controls transmission of the vehicle C, and a tracking control device 134, which manages a tracking control system, which adjusts a distance from the vehicle C itself to a preceding vehicle thereof. Further, the group of electronic control devices 130 includes an audio control device 135, which controls an audio apparatus mounted on the vehicle C, and a navigation control device 136, which controls a car navigation system mounted on the vehicle C. Further, the group of electronic control devices 130 includes a door lock control device 137, which controls a door lock state of the vehicle C itself, an air-conditioning control device 138, which controls an air conditioner mounted on the vehicle C itself, and a security apparatus control device 139, which controls various security apparatuses such as an alarm indicator, which turns on with an intruder into a passenger compartment, and upon a detection of the intruder. Other than the above, although not shown, the group of electronic control devices 130 further includes a control device for a temperature sensor that detects an outside temperature of the vehicle C, for example. The group of electronic control devices 130 including the respective control devices 131 to 139 and the like outputs control contents of the respective control devices 131 to 139 and the state of the vehicle C that can be detected by the respective control devices 131 to 139, to the vehicle-mounted information terminal 100. Further, the electronic control devices 130 output as necessary a DTC that is a failure diagnosis code indicating a diagnosis result and an analysis result of the failure state of apparatuses that are the control targets of the respective control devices 131 to 139 and the like, to the vehicle-mounted information terminal 100. Further, when a destination of the next travel is set in the car navigation system by the user of the vehicle C, the navigation control device 136 outputs information related to the set recipient to the vehicle-mounted information terminal 100. Accordingly, the vehicle-mounted information terminal 100 takes in information indicating the vehicle state of the brake, the steering and the like controlled by the electronic control devices 130, and the failure diagnosis code of the various vehicle-mounted apparatuses.

The vehicle-mounted information terminal 100, into which the various items of information as above are taken, includes a vehicle information collecting section 101, an uploading section 102, and an uploading condition table 103. The vehicle information collecting section 101 collects information input from the charge management device 110, the drive information recording device 120, and the electronic control devices 130 as the vehicle information indicating the state of the vehicle C itself. When the respective information is acquired from the charge management device 110, the drive information recording device 120, and the electronic control devices 130, the vehicle information collecting section 101 renews as necessary the respective acquired information each time the respective information is acquired.

The uploading section 102 acquires as necessary the vehicle information that is collected and renewed by the vehicle information collecting section 101, and uploads the acquired vehicle information to the management center 200 via the vehicle-mounted communicator 140. The uploading section 102 monitors the state of the vehicle C based on the vehicle information acquired from the vehicle information collecting section 101. Further, the uploading section 102 uploads the vehicle information to the management center 200 on condition that the state of the vehicle C has shifted to an upload state as a predefined state, based on a monitoring result.

In the embodiment, the uploading section 102 performs a determination on whether the state of the vehicle C has shifted to the predefined state through referencing the uploading condition table 103. The uploading condition table 103 registers the uploading condition that specifies the predefined state, that is, the upload state. That is, the uploading condition table 103 registers a plurality of conditions necessary for the vehicle-mounted information terminal 100 to upload the vehicle information to the management center 200.

As shown in FIG. 2, as the conditions under which the vehicle information is uploaded to the management center 200, the uploading condition table 103 includes a case in which the charging of the secondary battery B starts, a case in which the charging of the secondary battery B is ended, a case in which the charged rate of the secondary battery B increases by 20% or more, a case in which the power supply plug PG is forgotten to be inserted, and a case in which a loose connection occurs in the power supply plug PG. Similarly, as the condition to upload the vehicle information, a case in which an accessory position (ACC) has shifted from an ON state to an OFF state, in other words, a case in which the vehicle C has shifted from a driving state to the parked or stopped state, and a case in which a failure occurs in the vehicle C are defined. Other than these, as the uploading condition of the vehicle information, a case in which a request of the vehicle information from the management center 200 is made, that is, a case in which the state of the vehicle C has shifted from a state without request of vehicle information from the management center 200 to a state with request of vehicle information is also defined. In the embodiment, when the state of the vehicle C has shifted to the state defined in the uploading condition table 103 as above, the vehicle information is uploaded to the management center 200 from the vehicle-mounted information terminal 100, as that a significant state change has occurred in the vehicle C. Thus, according to the embodiment, the uploading of the vehicle information is not performed until such conditions are met, and the upload of the vehicle information is performed when the significant state change occurs in the vehicle C, in other words, only when the necessity to upload the vehicle information to the management center 200 has occurred. Further, in the embodiment, it is possible to upload the vehicle information by the determination of solely the vehicle-mounted information terminal 100 regardless of an external environment of the vehicle C so long as the state of the vehicle C satisfies the conditions registered in the uploading condition table 103.

Further, as shown in FIG. 2, the uploading condition of the vehicle information as above has a plurality of items of the vehicle information to be uploaded to the management center 200 from the vehicle-mounted information terminal 100 defined for each of the uploading conditions. For example, the items of the vehicle information that are to be uploaded to the management center 200 when the charging of the secondary battery B is started include the amount of remaining battery that is the remaining amount of the secondary battery B correlated to the charging rate of the current secondary battery B, the starting time (current time) of the charge of the secondary battery B, and the charging end time of the secondary battery B. Other than these, as items of the vehicle information to be updated to the management center 200 when the charging of the secondary battery B is started, items such as the state of power supplied from the power supplying device ST (AC power supply state) and a cause of charge starting of the secondary battery B, for example, based on which setting of the normal charging and the timer charging the charging has been started, are defined. In the embodiment, by defining such items of the vehicle information for each of the uploading conditions, when the state of the vehicle C changes, the vehicle information that is necessary and sufficient for learning the changed state is uploaded to the management center 200 from the vehicle-mounted information terminal 100.

Further, as shown in FIG. 1, the uploading section 102 includes a timer 102a having a clock function. When delivering vehicle information, a delivery time of the vehicle information is added to the vehicle information by referencing the timer 102a. For example, by the delivery time being added to the vehicle information indicating that the charging of the secondary battery B has been started, the management center 200 as the upload recipient of the vehicle information is capable of learning the charge starting time of the secondary battery B. That is, the management center 200 is capable of learning the time when the state of the vehicle C was in the state indicated by the vehicle information based on the delivery time added to the vehicle information.

Further, when a response indicating that the vehicle information was received does not arrive from the management center 200 within a predetermined time after the vehicle information with the delivery time added has been uploaded to the management center 200, the uploading section 102 of the embodiment uploads the vehicle information again to the management center 200 indicating that "an upload error occurred in the vehicle information".

When such vehicle information is uploaded again, that is, when an upload error occurs in the vehicle information received by the management center 200, a time lag occurs between the time at which the vehicle information is uploaded to the management center 200 through one or more re-uploads and the time of the initial delivery of the vehicle information. In this case, the management center 200 can no longer handle the delivery time added to the vehicle information as the time of the state of the vehicle C indicated by the vehicle information, and there is a risk that the state of the vehicle C cannot be learned together with the time. Thus, in the embodiment, at the re-uploading of the vehicle information, the uploading section 102 sets the delivery time to be added to the vehicle information to be the subject of the re-uploading as the delivery time added to the initial delivery. Due to this, even if a re-uploading accompanying an upload error of the vehicle information is performed, the management center 200 is capable of accurately learning the state of the vehicle C indicated by the vehicle information based on the delivery time added to the vehicle information.

As shown in FIG. 1, the management center 200 includes a center communicator 200R, a vehicle information collecting sever 210 and a customer information server 220. The center communicator 200R receives the vehicle information uploaded by the vehicle-mounted information terminal 100. The vehicle information collecting sever 210 collects the vehicle information received by the center communicator 200R. The customer information server 220 manages information of the user of the vehicle C, and generates guide information for notifying the state of the vehicle C to the user of the vehicle C based on the vehicle information collected in the vehicle information collecting sever 210.

In the present embodiment, the vehicle information providing device is configured by such a management center 200.

When the vehicle information uploaded from the vehicle C is received, the center communicator 200R transfers the received vehicle information to the vehicle information collecting sever 210. Further, the center communicator 200R returns a response signal indicating that the vehicle information has been received to the vehicle-mounted information terminal 100 of the vehicle C, which is a delivery source of the vehicle information. Moreover, the center communicator 200R receives a delivery request of the guide information for notifying the states of the vehicle C and the secondary battery B from the user information terminal, which is an information terminal, such as a cell phone 300 or a personal computer 310 possessed by the user of the vehicle C. Then, the center communicator 200R performs an upload request of the vehicle information to the vehicle-mounted information terminal 100 so as to acquire information necessary for generating the guide information to which the delivery request has been made.

The vehicle information collecting sever 210 includes a vehicle database 211, in which the vehicle information uploaded from the vehicle-mounted information terminal 100 is registered, a failure history database 212, in which a failure history of the respective vehicles is registered, and a statistics database 213, in which statistics data of the respective vehicles is registered. More specifically, in the vehicle database 211, each time the vehicle information is uploaded from the vehicle-mounted information terminal 100 to the management center 200, and the uploaded vehicle information is accumulated for each of the vehicles as the delivery source of the vehicle information.

In the failure history database 212, information related to failure contents, cause of failure, driving environment, temperature, and driving area upon the failure and the like is previously registered as the failure history of the respective vehicles. That is, in the failure history database 212, information indicating the failure of the vehicle C on which the vehicle-mounted information terminal 100 is mounted and the secondary battery B is registered as necessary among the vehicle information uploaded from the vehicle-mounted information terminal 100.

Further, in the statistics database 213, statistics data indicating properties of the respective vehicles and the secondary batteries mounted on the vehicles is registered. As such statistics data, for example, data indicating that the secondary battery of a certain standard mounted on a certain type of vehicle has a reduced charging efficiency in an environment with a temperature of 0 degrees Celsius or less, or in a certain driving area is registered. Further, as such statistics data, data indicating that a secondary battery of a certain standard mounted on a vehicle with a travel distance exceeding a predetermined distance and a secondary battery with a used period exceeding predetermined days have a stronger tendency of an occurrence of deterioration and decrease of capacity and the like is registered in the statistics database 213.

On the other hand, the customer information server 220 includes a user behavior database 221, a vehicle state determining section 222, a guide information generating section 223, a notification content database 224, and a user information table 225. In the user behavior database 221, information related to the destination set in the car navigation system or information indicating a drive history of the vehicle C, that is, information related to a behavior of the user of the vehicle C among the vehicle information uploaded from the vehicle-mounted information terminal 100 is registered.

The vehicle state determining section 222 determines the state of the vehicle C that is the delivery source of the vehicle information based on the vehicle information uploaded from the vehicle C. The vehicle state determining section 222 includes a behavior analyzing section 222a, which analyzes the behavior of the user of the vehicle C based on the information registered in the vehicle database 211 and the user behavior database 221. For example, the behavior analyzing section 222a analyzes a behavior pattern of a user of a certain vehicle, in other words a driving pattern of the vehicle that the user rides as having a tendency of driving in a specific drive segment for commuting in a specific time zone on weekdays, based on the information registered in the user behavior database 221. Further, for example, the behavior analyzing section 222a analyzes that a percentage of driving within 50 minutes from the end of the timer charging of the secondary battery is 70% as the driving pattern of a certain vehicle.

When the vehicle information is uploaded from the vehicle C, the vehicle state determining section 222 determines the state of the vehicle C by referencing the respective information registered in the vehicle database 211, the failure history database 212, the statistics database 213, and the user behavior database 221. That is, the vehicle state determining section 222 determines that the state of the vehicle C is in the loose connection state between the power supply plug PG and the secondary battery B caused by the power supply plug PG being forgotten to be inserted in a charging area where the power supplying device ST is located, based on the vehicle information uploaded from the vehicle C and registered in the vehicle database 211, for example. Further, the vehicle state determining section 222 determines that the vehicle C or the secondary battery B is in a state in which a failure is likely to occur due to the travel distance of the vehicle exceeding the predetermined travel distance and the outside temperature at or below the predetermined temperature, based on the information indicating the travel distance of the vehicle C registered in the vehicle database 211 and the information registered in the failure history database 212, for example. Similarly, the vehicle state determining section 222 determines that the secondary battery B is in the deteriorated state due to the travel distance of the vehicle C exceeding the predetermined travel distance, based on the information indicating the travel distance of the vehicle C registered in the vehicle database 211 and the information registered in the statistics database 213, for example. Further, the vehicle state determining section 222 determines that the charging rate of the secondary battery B is in a state with a charging rate lower than a charging rate necessary for reaching the destination from a current location of the vehicle C based on the information indicating the charging rate of the secondary battery B registered in the vehicle database 211 and the information related to the destination of the vehicle C registered in the user behavior database 221. Further, similarly, the vehicle state determining section 222 determines that the state of charge of the secondary battery B is in a state that charging time is insufficiently set by the charge management device 110 with respect to a travel distance predicted from the next trip based on the information indicating the charging rate of the secondary battery B registered in the vehicle database 211 and the analysis result of the behavior analyzing section 222*a*.

Upon determining the state of the vehicle C that is the delivery source of the upload, the vehicle state determining section 222 outputs the determination result to the guide information generating section 223 that generates the guide information for notifying the user of the state of the vehicle C.

When the determination result is input from the vehicle state determining section 222, the guide information generating section 223 references the notification content database 224 in which a plurality of types of patterns of notification contents of the guide information is registered, and the user information table 225 in which the information related to the user to whom the guide information is to be provided to is registered, and determines the content and a destination of delivery of the guide information to be delivered to the user.

As shown in FIG. 3 to FIG. 6, a message example notifying that the state of the vehicle C has shifted to a state satisfying the uploading condition of the vehicle information, a message example prompting maintenance of the vehicle C and the secondary battery B and the like are registered in the notification content database 224 in association with the informing condition (informing timing). Further, an ID is allocated to each pattern of the notification contents as an identifier in the notification content database 224 of the embodiment, and the respective guide information is managed by the ID. For example, as shown in FIG. 3, "ID1-1" defines "start charging" when the secondary battery B is in the charging state, and as items of the notification content thereof, current remaining power of the secondary battery B (amount of remaining battery), charge start time, and charging end expected time are associated. Further, in such "ID1-1", a message example of the guide information notified to the user of the vehicle C is associated. Such guide information is registered for each of the states of the vehicle C and the secondary battery B. Similarly, as shown in FIG. 4, in "ID3-1", the amount of remaining battery, the current time, the insertion state of the power supply plug PG, and a programmed schedule of the timer setting are associated as notification items for when the timer charging is not set within 30 minutes after parking the vehicle C despite being analyzed that the probability of the user of the vehicle C driving within 50 minutes after the end of the timer charging of the secondary battery B is 70% as a result of analysis by the behavior analyzing section 222*a*. Information prompting the setting of the timer charging is associated as a message example of the guide information to be notified to the user at such an occasion.

As exemplified in FIG. 7, names of user A to user n of the respective vehicles that are to be the delivery sources of the upload, and terminal information that is information related to the user information terminal as the information terminal that each of the user A to user n possesses are registered in association in the user information table 225. Among such, as the terminal information, for example a cell phone and a personal computer that the user A of the vehicle C possesses, and information related to a providing website of the guide information providing a listing service of the guide information to which the user A has subscribed are registered in the user information table 225. Similarly, for example for the name of the user B, information related to an application that can be executed on a cell phone that the user B possesses is registered as notifying means of the guide information for the user B. Further, phone numbers, e-mail addresses and the like that are necessary when delivering the guide information via the respective user information terminals are registered for each of the user information terminal. Moreover, IDa1 to IDa3, IDb1 to IDb4 and the like are allocated to each of the user information terminal and notifying means of guide information.

As shown in FIG. 1, when the determination result of the vehicle state is input from the vehicle state determining section 222, the guide information generating section 223 generates the guide information by referencing the informing condition and the message examples of the guide information registered in the notification content database 224. That is, the guide information generating section 223 generates a viewing screen delivered from the guide information providing website, letter information delivered to the e-mail addresses, audio information for dialing to the phone numbers and the like as the guide information. The guide information generating section 223 outputs the generated guide information to a guide information delivering section 200S that delivers the guide information to a cell phone 300 or a personal computer 310 possessed by the user of the vehicle C.

When the guide information generated by the guide information generating section 223 is acquired, the guide information delivering section 200S delivers the acquired guide information to the cell phone 300 or the personal computer 310. As a result, an e-mail delivery notifying the state of the vehicle C that the user possesses and audio guidance by an operator and the like are performed on the cell phone 300 and the personal computer 310. Further, the guide information delivering section 200S operates a providing website of the guide information that can be viewed via a network such as an Internet and the like for example by the personal computer 310, and renews as necessary the viewing screen provided by the providing website of the guide information based on the guide information.

In present the embodiment, with respect to a plurality of user information terminals, the guide information delivering section 200S detects presence and absence of viewing of the guide information for each of the user information terminals in view of delivering the guide information by using a plurality of types of communication means such as the e-mail and the audio guidance. That is, the guide information delivering section 200S detects the presence and absence of viewing of the guide information for example based on a read confirmation requesting function of e-mails, viewing history of the guide information providing website, call history of the audio guidance for the cell phone 300 and the like. Based on the detection result, when the presence of the viewing of the guide information by a certain user information terminal is detected, the guide information delivering section 200S performs one of the following processes to the other user information terminals registered together with the aforementioned certain user information terminal:

Process a: not delivering the relevant guide information, and

Process b: delivering the content that the relevant guide information has been viewed.

Moreover, in the present embodiment, a simultaneous delivery of the relevant information is periodically performed respectively to the user information terminals that a certain user possesses until when an abnormal state of the vehicle C or the secondary battery B is resolved. In the embodiment, as shown in FIG. 3 to FIG. 6 and FIG. 7, the guide information delivering section 200S manages the presence and absence of viewing of each guide information in each user information terminal based on the ID1-1 to ID6 defined by the guide information and IDa1 to IDn allocated to each of the user information terminal and the notifying means of guide information.

That is, as shown in FIG. 8, the management center 200 detects that the e-mail notifying the guide information for a guidance to start charging of the secondary battery B to which ID1-1 is defined is delivered to the cell phone 300 and the personal computer 310 defined as the terminals IDa1 and IDa2. Further, the management center 200 detects that the guide information for the guidance to start charging of the secondary battery B defined as ID1-1 is reflected to the providing website of the guide information that can be viewed by the personal computer 310 defined as the terminal IDa3. When a viewed response of the e-mail delivered to the cell phone 300 is confirmed, the management center 200 redelivers an e-mail with a content indicating that the content of the e-mail delivered to the personal computer 310 is dealt as having been read, or that the guide information has been read, to the personal computer 310. Notably, at this occasion, if the e-mail is not delivered to the personal computer 310, delivery of the guide information that has already been viewed by the cell phone 300 to the personal computer 310 is prohibited. Further, the management center 200 causes the providing website of the guide information to display guidance that the guide information has already been read. Due to this, in the embodiment, the guide information indicating the same content is not notified to the user for a plurality of times in delivering the guide information with the same content to a plurality of user information terminals, and a convenience regarding the viewing of the guide information is improved.

FIG. 9 illustrates an operation example of the vehicle information management system, the vehicle-mounted information terminal, and the vehicle information providing device of the embodiment.

As shown in FIG. 9, firstly, the vehicle information including the charge information of the secondary battery B is collected as necessary by the vehicle-mounted information terminal 100 mounted on the vehicle C. When the uploading condition of the collected vehicle information is satisfied, the vehicle-mounted information terminal 100 adds the delivery time to the vehicle information, and delivers the vehicle information to which the delivery time has been added, to the management center 200.

FIG. 9 also shows a case in which an upload error of the vehicle information has occurred because communication between the vehicle-mounted information terminal 100 and the management center 200 has not been established. The vehicle-mounted information terminal 100 re-uploads the vehicle information to the management center 200 with the initial delivery time to the vehicle information added until when the upload of the vehicle information to the management center 200 has been completed.

Figure 10:
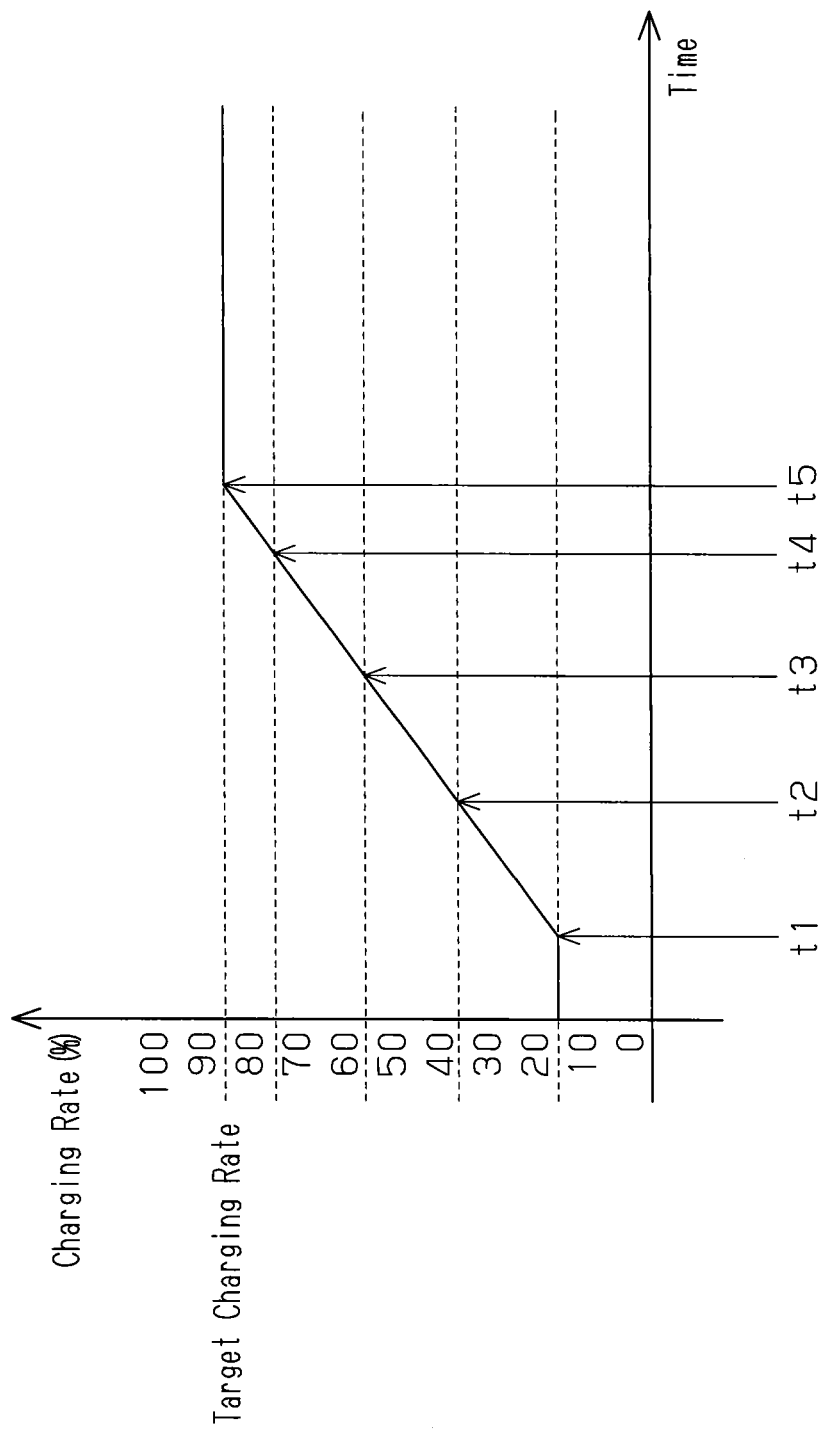
FIG. 10 is a time chart showing an example of shifting of a charging rate of the second battery mounted on the vehicle of FIG. 1 and an uploading timing of the vehicle information indicating the charging rate.

By the upload of the vehicle information through an uploading process being performed as necessary, for example as shown in FIG. 10, at charging of the secondary battery B, in order to notify the user of the vehicle C of the progress of the charging, the vehicle information including the charge information indicating the charge rate is uploaded to the management center 200 from the vehicle-mounted information terminal 100 at timing t1, when the charging of the secondary battery B has been started. Similarly, at timings t2 to t4, when the charging rate of the secondary battery B increases by 20% accompanying the charging and timing t5, when the charging rate of the secondary battery B reaches 90%, which is the target charging rate, the vehicle information including the charge information indicating the charge rate is uploaded to the management center 200 from the vehicle-mounted information terminal 100. Thus, for example, the vehicle information indicating that the state of the vehicle C has changed is no longer incrementally uploaded to the management center 200 from the vehicle-mounted information terminal 100 each time the charging rate of the secondary battery B is incrementally changed. The uploading of the vehicle information is performed only when a change with an increasing influence on a driving performance and the like of the vehicle C occurs in the vehicle C and the secondary battery B, for example when the start and end of the charging of the secondary battery B, an increase in the charging rate of the secondary battery B in the predetermined units, and the like. Accordingly, it is possible to upload the vehicle information with necessary information volume at necessary timing to the management center 200 from the vehicle-mounted information terminal 100.

As shown in FIG. 9, when the vehicle information is uploaded to the management center 200 from the vehicle-mounted information terminal 100, the management center 200 responds to the vehicle-mounted information terminal 100 of the receipt for the vehicle information, and determines the state of the vehicle C indicated by the vehicle information. The management center 200 generates the guide information for delivering to the cell phone 300 and the personal computer 310 possessed by the user of the vehicle C based on the determined state of the vehicle C, and the informing condition and the notification contents of the various types of guide information registered in the notification content database 224. Thereafter, the management center 200 determines the recipient and the notifying means for the generated guide information based on the information registered in the user information table 225 shown previously in FIG. 7. The management center 200 delivers the generated guide information to the cell phone 300 and the personal computer 310 possessed by the user of the vehicle C based on the recipient and the notifying means as determined for the guide information. As a result, an e-mail describing the message example shown previously in FIG. 3 to FIG. 6 is delivered, or an audio guidance in accordance with such message example are notified for example to the cell phone 300. Further, for example, the generated guide information is reflected in the viewing screen of the providing website of the guide information, and the viewing screen onto which the guide information has been reflected becomes viewable from the personal computer 310. Thus, for example, the charging rate of the secondary battery B mounted on the vehicle C itself, the charge progress, the charging end expected time, the confirmation of necessity of charging of the secondary battery B when the timer charging is not set for the secondary battery B, the drivable distance of the vehicle C and the like are notified to the user of such a cell phone 300 and personal computer 310 in accordance with the state of the vehicle C.

On the other hand, when a request for the guide information is made to the management center 200 by the user of the cell phone 300 and the personal computer 310 so as to learn the state of the vehicle C that the user possesses, the management center 200 generates guide information for informing the contents to which the request was made. The management center 200 delivers the generated guide information to the cell phone 300 and the personal computer 310 that have made the request. Thus, information notifying whether the charging rate of the secondary battery B is sufficient for the next destination, and information notifying a total travel distance of the vehicle C are provided to the user of such a cell phone 300 and personal computer 310.

FIG. 11 illustrates a delivering procedure of the guide information by the management center 200 of the embodiment.

As shown in FIG. 11, firstly, when the guide information is generated, the management center 200 determines the recipient and the notifying means of the generated guide information through referencing the user information table 225. The management center 200 delivers the generated guide information for example to the cell phone 300 by e-mail delivery, and reflects the same to the providing website of the guide information that is viewable from the personal computer 310.

When the guide information delivered to the cell phone 300 is viewed by the user of the cell phone 300, the cell phone 300 delivers the viewed response of the guide information to the management center 200. The management center 200 acknowledges that the guide information delivered by the management center 200 has been confirmed by the user, and performs a delivery to the other user information terminals that the user possesses indicating that the guide information has been viewed. As a result, the providing website of the guide information that is viewable from the personal computer 310 notifies that the guide information viewed from the cell phone 300 has already been viewed.

On the other hand, in view of the importance of guide information informing that an abnormality has occurred in the vehicle C or the secondary battery B as the delivery source of the vehicle information, the management center 200 periodically performs simultaneous delivery of the guide information alerting about the abnormal state of the vehicle C and the secondary battery B until the abnormal state of the vehicle C or the secondary battery B is resolved, regardless of the presence and absence of viewing of the guide information. Thus, it is possible to alert the user of the vehicle C that the abnormality has occurred in the vehicle C or the secondary battery B, and to prompt the abnormal state to be resolved.

As described above, according to the vehicle information management system, the vehicle-mounted information terminal, and the vehicle information providing device of the embodiment, the following advantages are obtained.

(1) The vehicle-mounted information terminal 100 uploads the vehicle information collected in the vehicle-mounted information terminal 100 to the management center 200 on condition that the state of the vehicle C has shifted to the predefined state for uploading the vehicle information to the management center 200. Due to this, the vehicle-mounted information terminal 100 is capable of uploading the vehicle information of the vehicle C, to which the shifting of the state has been reflected, to the management center 200 at the timing when the vehicle state has shifted to the predefined state. Thus, the vehicle-mounted information terminal 100 can upload the vehicle information to the management center 200 at the exact required timing with the needed information volume.

The management center 200 can manage such vehicle information. The vehicle-mounted information terminal 100 determines the necessity of the uploading of the vehicle information based on whether the vehicle state has shifted to the predefined state. Thus, the uploading condition of the vehicle information is not dependent on an external environment of the vehicle C. Accordingly, the vehicle-mounted information terminal 100 is capable of uploading the vehicle information at a higher degree of freedom solely by the vehicle-mounted information terminal 100 itself, and is capable of uploading the vehicle information at a more accurate timing.

(2) The vehicle-mounted information terminal 100 selects a time when a significant change has occurred in the state of the vehicle C as "the time when the state of the vehicle C has shifted to the predefined state". The vehicle-mounted information terminal 100 uploads the vehicle information indicating such a significant change to the management center 200. Accordingly, the management center 200 is capable of collecting only the highly useful vehicle information in learning the vehicle state based on the vehicle information uploaded from the vehicle-mounted information terminal 100.

(3) The vehicle-mounted information terminal 100 defines the change in an accessory position from an ON state to an OFF state, the change in the charging rate of the secondary battery B by 20%, the start and end of the charging of the secondary battery B, the occurrence of the abnormal state and the like as the "significant change in the vehicle C". Thus, the management center 200 is capable of accurately acquiring the travel distance that is renewed as necessary when the vehicle C is driven, the information indicating the decreasing charging rate of the secondary battery B accompanying the vehicle C being driven, the information indicating the start and end of the charging of the secondary battery B, information indicating the occurrence of the abnormal state, and the like. Accordingly, the management center 200 is capable of accurately learning the state of the vehicle C as the source of the vehicle information based on the vehicle information with the necessity minimum information volume.

(4) The vehicle-mounted information terminal 100 includes remaining charging time required for the charging to be completed when the secondary battery B is in the state of charging, the connection state between the power supply plug PG and the secondary battery B, the deteriorated state of the secondary battery B, the possible travel distance correlated to the state of charge of the secondary battery B, and the charging rate of the secondary battery B in the vehicle information to be collected. Thus, the management center 200 is capable of learning the states of the vehicle C and the secondary battery B in detail based on the vehicle information that encompasses such information.

(5) The vehicle-mounted information terminal 100 adds the delivery time at uploading of the vehicle information. Further, when an upload error of the vehicle information with respect to the management center 200 occurs, the vehicle-mounted information terminal 100 re-uploads the vehicle information for which the upload error has occurred, and the delivery time to be added to the vehicle information to be re-uploaded is set to the delivery time that have been added in the initial delivery of the vehicle information. Thus, the management center 200 is capable of learning the time of the vehicle C indicated by the vehicle information based on the delivery time added to the vehicle information. Even if the communication environment between the vehicle-mounted information terminal 100 and the management center 200 deteriorates, the vehicle-mounted information terminal 100 is capable of surely uploading the vehicle information and the delivery time thereof to the management center 200.

(6) The vehicle-mounted information terminal 100 configures the vehicle information as information including a plurality of items indicating the state of the vehicle C, defines the conditions as the conditions under which the vehicle information should be uploaded, and associates one or more of items indicating the state of the vehicle C for each of the defined conditions. In regards to the uploading of the vehicle information, the vehicle-mounted information terminal 100 uploads the items associated to each condition to the management center 200. Thus, the vehicle-mounted information terminal 100 is capable of accurately learning the state change in the vehicle C, and capable of the uploading of the vehicle information with the necessity minimum of information volume for communicating the state of the vehicle C.

(7) The management center 200 generates the guide information for notifying the user of the state of the vehicle C based on the vehicle information, and delivers the generated guide information to the cell phone 300 and personal computer 310 as the user information terminals that the owner of the vehicle C possesses. Thus, the owner of the vehicle C is capable of remotely learning the state of the vehicle C that the owner possesses based on the guide information provided through the cell phone 300 and personal computer 310. Further, since such guide information it has been uploaded to the management center 200 on condition that the state of the vehicle C has shifted to the defined condition, as a combined effect thereof, the management center 200 is capable of providing the user with the useful guide information in which the state change of the vehicle C has been reflected.

(8) The management center 200 delivers the relevant guide information to the user information terminals that is registered in advance for each of owners (users) of vehicles C. Thus, an expansion of communication means of the guide information is achieved, and the guide information can more surely be communicated to the user of the vehicle C.

(9) The management center 200 detects the presence and absence of viewing of the guide information by the owner of the cell phone 300 and personal computer 310 for each of the user information terminals and the notifying means, and when a presence of the viewing of the guide information by a certain user information terminal is detected, the aforementioned process a or the process b is performed for the other user information terminals that were registered together with the aforementioned certain user information terminal. Thus, the management center 200 is prevented from redundantly providing the guide information indicating the same content to the user of the vehicle C at the delivery of the guide information through the user information terminals. Accordingly, the convenience related to the viewing of the guide information delivered from the management center 200 is improved.

(10) The management center 200 periodically performs simultaneous delivery of the relevant guide information to the user information terminals until when the abnormal state of the vehicle C or the secondary battery B is resolved. Thus, the management center 200 is capable of surely informing the user of the occurrence of the abnormality in the vehicle C and the secondary battery B, and in addition, is capable of prompting the user to resolve the abnormal state of the vehicle C and secondary battery B.

(11) The management center 200 delivers information notifying the remaining charging time of the secondary battery B, information notifying non-charging state of the secondary battery B accompanying forgotten insertion of the power supply plug PG or loose connection thereof, or the deteriorated state of the secondary battery B, and information notifying the insufficient charge for the planned travel distance of the vehicle C, as the guide information to the cell phone 300 and personal computer 310. Thus, at the charging of the vehicle C onto which the secondary battery B is mounted, the management center 200 is capable of notifying in advance a circumstance that would be disadvantageous to the user of the vehicle C, especially the circumstance in which the charging of the secondary battery B is not started accompanying forgotten insertion of the power supply plug PG and the like, the circumstance in which the destination set in the vehicle C cannot be reached by the charging rate of the secondary battery B, and the like. Thus, the convenience of the secondary battery B and the vehicle C is improved through the guidance of the state of the secondary battery B.

(12) The management center 200 includes the vehicle database 211, in which the vehicle information is registered, the failure history database 212, in which the failure histories of the vehicles are registered, and the statistics database 213, in which the statistics data of the vehicles for each vehicle type is registered. The management center 200 generates the guide information so as to include information registered in the respective databases 211 to 213. Due to this, the management center 200 is capable of collectively managing the uploaded vehicle information by the vehicle database 211, and capable of generating the guide information in view of the failure history unique to each vehicle type of the vehicle C as the providing destination of the guide information. Thus, the management center 200 is capable of performing the guidance of the vehicle C and the secondary battery B in greater detail.

(13) The management center 200 includes the behavior analyzing section 222a, which analyzes the behavior of the user of the vehicle C based on the vehicle information. The management center 200 generates the guide information so as to include the analysis result by the behavior analyzing section 222a. Accordingly, the management center 200 is capable of generating the guide information in which the behavior pattern of the driver of the vehicle is reflected, which leads to being capable of providing the guide information corresponding to the behavior pattern of the driver.

(14) The management center 200 manages the delivery recipient of the guide information by separate IDs for each of the user information terminals and each of the notifying means. Accordingly, the management center 200 is capable of easily determining the delivery recipient of the guide information, and is capable of separately setting the notifying means of guide information using the function of each user information terminal. Further, the management center 200 is capable of accurately delivering the guide information using the respective user information terminals and the notifying means by confirming the delivery of the guide information and the viewed state based on the IDs defined for each of the user information terminals and each of the notifying means.

(15) The management center 200 includes the guide information generating section 223 that generates the guide information, and the guide information delivering section 200S that delivers the generated guide information to the cell phone 300 and the personal computer 310 that the user of the vehicle C possesses. Due to this, the management center 200 is capable of generating and delivering the guide information that can notify the state of the vehicle C and the state of the secondary battery B mounted on the vehicle C, based on the vehicle information collected from the vehicle C.

The embodiment may be modified as follows.

The providing website of the guide information may be operated and organized by the guide information delivering section 200S of the management center 200. However, not limited thereto, the providing website of the guide information may be organized by a dedicated vendor that provides guidance based on the guide information generated by the guide information generating section 223 and that is independent from the management center 200.

The management center 200 may be configured of a total of two servers, namely the vehicle information collecting sever 210 and the customer information server 220. However not limited thereto, the management center 200 may be configured of a single server having the function corresponding to both the vehicle information collecting sever 210 and the customer information server 220.

The management center 200 includes the vehicle database 211, the statistics database 213, the user behavior database 221, the notification content database 224, and the user information table 225 as the respective databases and the like to be used for the generation of the guide information. However, not limited thereto, instead of the databases and the like as above, a single database including the respective information such as the vehicle information, the failure history, the statistics data and the like may be used. Further, the guide information only needs to be information that is generated based on the vehicle information uploaded to the management center 200. That is, a configuration that omits the respective databases 211 to 213, 221, 224, and the user information table 225 is possible. In this case, the guide information is generated by a predetermined program that is build in advance.

The management center 200 may generate guide information with the notification content exemplified previously in FIG. 3 to FIG. 6 as the guide information. However, not limited thereto, the guide information to be provided to the user of the vehicle C only needs to have a content that can notify the state of the vehicle C or the secondary battery B to the user; for example, the vehicle information uploaded from the vehicle-mounted information terminal 100 can be used as the guide information as it is. In this case, the delivery of the guide information from the management center 200 to the cell phone 300 and the personal computer 310 is performed by transferring the guide information uploaded to the management center 200, from the management center 200 to the cell phone 300 and the personal computer 310. Other than this, as the guide information, arbitrary notification content and message can be set.

The management center 200 performed periodical and simultaneous delivery of the relevant guide information to the user information terminals until when the abnormal state in the vehicle information indicating the abnormal state of the vehicle C or the secondary battery B is resolved. However, not limited thereto, the management center 200 may end the simultaneous delivery of the guide information alerting about the abnormal state of the vehicle C and the secondary battery B on condition that a predetermined time required for resolving the abnormality has elapsed after the occurrence in the vehicle C and the secondary battery B. Further, other than this, the management center 200 can deal the guide information alerting about the abnormal state of the vehicle C and the secondary battery B in a similar manner to the other guide information.

When viewing of the guide information in a certain user information terminal is detected, the management center 200 performs one of the following processes to the other user information terminals registered together with the certain user information terminal:

Process a: not delivering the relevant guide information, and

Process b: delivering that the relevant guide information has been viewed.

However, not limited thereto, the management center 200 may deliver the generated guide information to all of the user information terminals that the user of the vehicle C possesses regardless of the presence and absence of the viewing of the guide information.

The identifiers IDa1 to IDa3 and IDb1 to IDb4 are predefined for each of the user information terminals and the notifying means of the guide information. Further, ID is predefined for each of the notification contents of the guide information registered in the notification content database 224. The management center 200 manages the delivery recipient of the guide information, the viewed states, the notification contents and the like by using such an ID. However, not limited thereto, the ID may be omitted so long as the management of the delivery recipient of the guide information, the viewed states, the notification contents and the like can be performed. In this case, the management center 200 is capable of performing the management of the delivery recipient of the guide information by using names and the like of the respective user information terminals, for example.

The management center 200 performs the management of the delivery of the guide information and the viewed states in units of the user information terminals and the notifying means of guide information in the user information terminals. However, not limited thereto, the management center 200 can perform the management of the delivery of the guide information and the viewed states in units of only the respective user information terminals. In this case, for example even if three types of notifying means of the guide information are present in one user information terminal, namely, email, audio guidance, and application, the management center 200 performs the management of the delivery of the guide information and the viewed states for only one of the means.

The management center 200 delivers the relevant guide information to a plurality of user information terminals previously registered for each of the owners of the vehicles C, that is, for each of the users. However, not limited thereto, the delivery recipient of the guide information may be one of the user information terminals that the user of the vehicle C possesses.

The management center 200 generates the guide information for notifying the state of the vehicle C to the user based on the vehicle information, and delivers the generated guide information to the cell phone 300 and the personal computer 310 that the owner of the vehicle C possesses. However, not limited thereto, manners in which the vehicle information uploaded to the management center 200 is used are arbitrary. For example, the management center 200 may not perform the generation and delivery of the guide information, and may use the vehicle information collected in the management center 200 for generation of traffic information or for generation of the statistics data for each vehicle type.

The vehicle-mounted information terminal 100 configured the vehicle information as information including the items indicating the state of the vehicle C. Further, the vehicle-mounted information terminal 100 defines the types of conditions as the conditions under which the vehicle information should be uploaded. One or more items indicating the state of the vehicle C are associated for each of the defined conditions. However, not limited thereto, the vehicle-mounted information terminal 100 may configure the vehicle information as information only indicating the charging rate of the secondary battery B, for example, and may upload only the information indicating the charging rate of the secondary battery B to the management center 200 on the condition that the uploading condition of the vehicle information is satisfied.

When an uploading error of the vehicle information to the management center 200 occurs, the vehicle-mounted information terminal 100 re-uploads the vehicle information that the uploading error has occurred, and the delivery time to be added to the vehicle information in the re-uploading is set as the delivery time added at the initial delivery of the vehicle information. However, not limited thereto, when an uploading error of the vehicle information to the management center 200 occurs, the vehicle-mounted information terminal 100 may collect again the vehicle information that the uploading error has occurred. Then, the vehicle-mounted information terminal 100 may upload the collected vehicle information with the current delivery time added. In this case also, it is possible to suppress delay in the delivery time added to the vehicle information from the time of the vehicle C indicated by the vehicle information. Further, other than this, the vehicle-mounted information terminal 100 may not perform re-uploading of the vehicle information that an uploading error has occurred. Similarly, the timer 102a of the uploading section 102 may be omitted from the configuration, and the vehicle-mounted information terminal 100 may not add the delivery time to the vehicle information. In this case, the management center 200 may handle the time at which the vehicle information is uploaded to the management center 200 as the time of the state of the vehicle C indicated by the vehicle information, for example.

The vehicle-mounted information terminal 100 collects the charge information indicating increase in the charging rate of the secondary battery B as the vehicle information, and the management center 200 provides the guide information based on the collected charge information to the user of the vehicle C. However, not limited thereto, the vehicle-mounted information terminal 100 may set a decrease in the charging rate of the secondary battery B, for example, by 5% as the uploading condition of the vehicle information in a case where the charging rate of the secondary battery B decreases through self discharge of the secondary battery B. In this case, the user is capable of remotely learning that the charging rate of the secondary battery B mounted on the vehicle C decreases due to the self discharge and the like.

The vehicle-mounted information terminal 100 includes all of the remaining charging time required for the charging to be completed when the secondary battery B is in the charging state, the connected state between the power supply plug PG and the secondary battery B, the deteriorated state of the secondary battery B, the possible travel distance correlated with the charging state of the secondary battery B, and the charging rate of the secondary battery B, as the vehicle information to be collected. However, not limited thereto, the vehicle information may be information indicating only one of the respective items. In summary, the vehicle information that the vehicle-mounted information terminal 100 uploads to the management center 200 may be any information so long as it is information that can indicate the states of the vehicle C and the secondary battery B, and for example, it may be information indicating the standard of the secondary battery B.

The vehicle-mounted information terminal 100 of the respective embodiments performs the uploading of the vehicle information on condition that the state of the vehicle C has satisfied the uploading condition exemplified in FIG. 2. However, not limited thereto, the vehicle-mounted information terminal 100 may perform the uploading of the vehicle information, for example, on condition that the control device such as the electronic control devices 130 and the like has shifted from a stopped state to an activated state, or the respective control devices has shifted from the activated state to the stopped state. In this case, the vehicle-mounted information terminal 100 is capable of uploading the vehicle information based on an operation state of the respective control devices that control the state of the vehicle C. In this case also, advantages similar to the advantages (2) and (3) as above can be achieved. Other than this, the uploading condition of the vehicle information may be any condition so long as it sets a condition that the state of the vehicle C has changed; for example, the vehicle-mounted information terminal 100 is capable of performing the uploading of the vehicle information assuming that the state of the vehicle C has changed for example on condition that a predetermined time has elapsed.

The vehicle-mounted information terminal 100 defines the change of the accessory position (ACC) of the vehicle C from the on state to the off state as one of the uploading condition of the vehicle information. However, not limited thereto, it is possible to assume that the vehicle C has shifted to the parked state from the driving state when the ignition of the vehicle C has changed from an on state to an off state, and thereby to assume that the uploading condition of the vehicle information has been satisfied. In this case also, as exemplified in FIG. 2, on condition that the ignition has changed from the on state to the off state as above, the vehicle-mounted information terminal 100 can upload the vehicle information indicating the respective items such as the current battery amount of the secondary battery B, the current time and the like to the management center 200. Further, a change in the vehicle bus BS from an activated state to an inactivated state may be defined as one of the uploading conditions of the vehicle information, and the vehicle-mounted information terminal 100 may upload the vehicle information indicating the respective items such as the current battery amount of the secondary battery B, the current time and the like to the management center 200 as exemplified in FIG. 2, on condition that the above condition has been satisfied. In this case, the vehicle information is capable of being uploaded with criteria on that the state of the vehicle C has changed from a dynamic state to a static state, such as at completion of charging of the secondary battery B, end of driving of the vehicle C and the like. Thus, the vehicle information indicating the state of the vehicle C at shifting to a stable state, and the vehicle information that is updated as necessary when the vehicle C is in the dynamic state can collectively be uploaded. Other than this, as the uploading condition of the vehicle information, the change of the ignition of the vehicle C from the off state to the on state, and the change of the accessory position from the off state to the on state may be defined. In this case, the vehicle information indicating the state of the vehicle C when the vehicle C has changed from the parked state to the driving state, and the vehicle information that is accumulated and renewed during when the vehicle C is stopping can collectively be uploaded to the management center 200. Similarly, as the uploading condition of the vehicle information, the change of the vehicle bus from the inactivated state to the activated state may be defined. In this case, the vehicle information can be uploaded to the management center 200 with criteria on that the state of the vehicle C has changed from the static state to the dynamic state such as at the start of charging the secondary battery B, the start of driving the vehicle C, and the like. Thus, the vehicle-mounted information terminal 100 is capable of collectively uploading the vehicle information indicating the state of the vehicle C at shifting to the dynamic state, and the vehicle information accumulated when the vehicle C is in the static state. Further, other than this, the adaptation of the present disclosure is possible so long as the vehicle information is uploaded on condition that the state of the vehicle C has shifted to the predefined state regardless of the change having occurred in the vehicle C being significant, and it is possible to reduce the number of uploads of the vehicle C.

The vehicle-mounted information terminal 100 renews as necessary the vehicle information collected in the vehicle information collecting section 101, and uploads the latest renewed vehicle information that has been updated to the management center 200. However, not limited thereto, the vehicle-mounted information terminal 100 may accumulate as necessary the vehicle information collected in the vehicle information collecting section 101, and may upload all of the vehicle information accumulated in the vehicle information collecting section 101 to the management center 200 on condition that the uploading condition has been satisfied. In this case also, the vehicle-mounted information terminal 100 is capable of reducing the number of uploads of the vehicle information to the management center 200, and it is possible to reduce a communication traffic between the vehicle-mounted information terminal 100 and the management center 200. Further, in this case, the management center 200 is capable of acquiring all of the vehicle information collected in the vehicle information collecting section 101, and is capable of also acquiring the shifting of the vehicle information until when the state of the vehicle C has shifted.

As the user information terminals, the cell phone 300 and the personal computer 310 are used. However, the user information terminal may be any terminal as long as it is possessed by the user and capable of notifying the user of the guide information through audio, images, and the like.

100: vehicle-mounted information terminal
101: vehicle information collecting section
102: uploading section
102a: timer
103: uploading condition table
110: charge management device
120: drive information recording device
130: group of electronic control devices
131: brake control device
132: steering control device
133: transmission control device
134: tracking control device
135: audio control device
136: navigation control device
137: door lock control device
138: air conditioner control device
139: security apparatus control device
140: vehicle-mounted communicator
200: management center
200R: center communicator
200S: guide information delivering section
210: vehicle information collecting sever
211: vehicle database
212: failure history database
213: statistics database
220: customer information server
221: user behavior database
222: vehicle state determining section
222a: behavior analyzing section
223: guide information generating section
224: notification content database
225: user information table
300: cell phone
310: personal computer
B: secondary battery
C: vehicle
BS: vehicle bus
CC: power supply inlet
PC: power supply cable
PG: power supply plug
ST: power supplying device

The invention claimed is:

1. A vehicle information management system comprising a vehicle-mounted information terminal and a management center, wherein
the vehicle-mounted information terminal is configured to collect vehicle information including charge information indicating a charging state of a secondary battery, the secondary battery being mounted on a vehicle configured of an electric vehicle or a hybrid vehicle,
the management center is configured to control vehicle information uploaded from the vehicle-mounted information terminal,
the vehicle-mounted information terminal is configured to monitor a vehicle state that is a state of a vehicle on which the vehicle-mounted information terminal is mounted and the monitored vehicle state is indicatable by the vehicle information,
the vehicle-mounted information terminal is further configured to upload the vehicle information to the management center in response to shifting of the vehicle state to an upload state as a predefined state based on a monitoring result that is a result of the monitoring, and
the vehicle-mounted information terminal is configured to set conditions under which the vehicle information is to be uploaded in accordance with a type of the vehicle information.

2. The vehicle information management system according to claim 1, wherein
shifting of the vehicle state to the upload state refers to the occurrence of a significant change in the vehicle state, and
the vehicle-mounted information terminal is configured to upload vehicle information indicating the significant change to the management center.

3. The vehicle information management system according to claim 2, wherein the significant change in the vehicle state is at least one of:
a change in the vehicle from an ignition-ON state to an ignition-OFF state;
a change in an accessory position of the vehicle from an ON state to an OFF state;
a change in a vehicle bus, which connects the vehicle-mounted information terminal and a control system of the vehicle to each other within the vehicle by a bus from an activated state to an inactivated state;
a change from an ignition-OFF state to an ignition-ON state;
a change in the accessory position from an OFF state to an ON state; and
a change in the vehicle bus from the inactivated state to the activated state.

4. The vehicle information management system according to claim 1, wherein the vehicle information includes information indicating at least one of:
a remaining charging time required for charging to be completed when the secondary battery is in a state of charging;
a connection state between a power supply plug that supplies power to the secondary battery and the secondary battery;
a deteriorated state of the secondary battery;
a possible vehicle travel distance correlated to the charging state of the secondary battery; and
a charging rate of the secondary battery.

5. The vehicle information management system according to claim 1, wherein
the vehicle-mounted information terminal has a function to add information indicating a delivery time to the vehicle information,
the vehicle-mounted information terminal is configured to upload the vehicle information to which the delivery time is added to the management center, and
the vehicle-mounted information terminal is configured, when an upload error occurs in the vehicle information to the management center, to re-upload the vehicle information that the upload error has occurred to the management center, and sets the delivery time added to the vehicle information upon an initial delivery as the delivery time to be added to the vehicle information to be re-uploaded.

6. A vehicle information management system comprising a vehicle-mounted information terminal and a management center, wherein the vehicle-mounted information terminal is configured to collect vehicle information including charge information indicating a charging state of a secondary battery, the secondary battery being mounted on a vehicle configured of an electric vehicle or a hybrid vehicle, the management center is configured to control vehicle information uploaded from the vehicle-mounted information terminal, the vehicle-mounted information terminal is configured to monitor a vehicle state that is a state of a vehicle on which the vehicle-mounted information terminal is mounted and the monitored vehicle state is indicatable by the vehicle information, the vehicle-mounted information terminal is further configured to upload the vehicle information to the management center in response to shifting of the vehicle state to an upload state as a predefined state based on a monitoring result that is a result of the monitoring, the vehicle information includes a plurality of items indicating the vehicle state, a plurality of types of conditions are defined as conditions under which the vehicle information is to be uploaded, one or more items indicating the vehicle state are associated with each of the defined conditions, and the vehicle-mounted information terminal is configured, in response to shifting of the vehicle state to a corresponding condition, to upload information related to the one or more of items associated to the condition to the management center.

7. The vehicle information management system according to claim 1, wherein the management center is configured to generate guide information for guiding a user of the vehicle with respect to the vehicle state based on the vehicle information uploaded from the vehicle-mounted information terminal, and the management center is further configured to deliver the generated guide information to a user information terminal as an information terminal possessed by an owner of the vehicle.

8. The vehicle information management system according to claim 7, wherein the management center is configured to deliver relevant guide information to a plurality of user information terminals each of which has previously been registered for each of owners of the vehicles.

9. The vehicle information management system according to claim 8, wherein the management center is configured, upon delivery of the guide information to the user information terminals, to detect presence or absence of viewing of the guide information by the owners of the user information terminals for each of the user information terminals, and the management center is further configured, when the presence of the viewing of the guide information by a certain user information terminal is detected based on a view detection result that is a result of the detecting, to perform one of the following processes to other user information terminals registered together with the certain user information terminal:

Process a: not delivering the relevant guide information, and

Process b: delivering that the relevant guide information has been viewed.

10. The vehicle information management system according to claim 8, wherein the management center is configured to periodically perform simultaneous delivery of the guide information related to vehicle information indicating a relevant abnormal state to each of the user information terminals until when the abnormal state of the vehicle or the secondary battery is resolved.

11. The vehicle information management system according to claim 7, wherein, when information indicating at least one of the followings is included in the vehicle information:

a remaining charging time required for charging of the secondary battery in a state of charging to be completed;

a connection state between a power supply plug that supplies power to the secondary battery and the secondary battery;

a deteriorated state of the secondary battery;

a possible vehicle travel distance correlated to the charging state of the secondary battery; and a remaining charge of the secondary battery, the management center is configured to deliver at least one of the followings as the guide information to the user information terminal:

information guiding the remaining charging time of the secondary battery;

information guiding a non-charging state of the secondary battery accompanying loose connection of the power supply plug;

information guiding the deteriorated state of the secondary battery; and information guiding insufficient charge for a planned travel distance of the vehicle.

12. The vehicle information management system according to claim 7, wherein the management center includes:

a vehicle database in which the vehicle information is registered;

a failure history database in which a failure history of the vehicle is registered; and a statistics database in which statistics data of the vehicle for each vehicle type is registered, and the management center is configured to generate the guide information so as to include information that is registered in at least one of the vehicle database, the failure history database, and the statistics database.

13. The vehicle information management system according to claim 7, wherein the management center includes a behavior analyzing circuitry that analyzes behavior of a user of the vehicle based on the vehicle information, and the management center is configured to generate the guide information with an analysis result of the behavior analyzing circuitry as an index.

14. A vehicle-mounted information terminal that collects vehicle information, wherein the vehicle information includes charge information indicating a charging state of a secondary battery mounted on a vehicle configured of an electric vehicle or a hybrid vehicle, the vehicle-mounted information terminal is configured to upload collected vehicle information via a wireless communication to a management center that controls the vehicle information, the vehicle-mounted information terminal is configured to monitor a vehicle state that is a state of a vehicle on which the vehicle-mounted information terminal is mounted and the monitored vehicle state is indicatable by the vehicle information, and upload the vehicle information to the management center in response to shifting of the vehicle state to an upload state as a predefined state based on a monitored result, and the vehicle-mounted information terminal is configured to set conditions under which the vehicle information is to be uploaded in accordance with a type of the vehicle information.

15. A vehicle information providing device in a management center, wherein the management center is configured to collect vehicle information via a wireless communication from a vehicle-mounted information terminal mounted on a vehicle and manage the vehicle information, the vehicle information including charge information indicating a charging state of a secondary battery mounted on the vehicle configured of an electric vehicle or a hybrid vehicle, the vehicle information providing device comprising:

a guide information generating circuitry, which generates guide information for guiding a user of the vehicle of a vehicle state that is a state of the vehicle based on the vehicle information collected from the vehicle-mounted information terminal; and a guide information delivering circuitry, which delivers the guide information generated by the guide information generating circuitry to a user information terminal as an information terminal that the relevant user of the vehicle possesses, the guide information generating circuitry is configured to collect vehicle information uploaded from the vehicle-mounted information terminal in response to shifting of the vehicle state to a predefined upload state, and the predefined upload state is set by vehicle conditions under which the vehicle information is to be uploaded from the vehicle-mounted information terminal in accordance with a type of the vehicle information.

* * * * *